(12) United States Patent
Hurt et al.

(10) Patent No.: US 8,506,923 B2
(45) Date of Patent: Aug. 13, 2013

(54) NANOSTRUCTURED SORBENT MATERIALS FOR CAPTURING ENVIRONMENTAL MERCURY VAPOR

(75) Inventors: Robert H. Hurt, Barrington, RI (US); Steven P. Hamburg, Providence, RI (US); Love Sarin, Providence, RI (US); Indrek Kulaots, East Providence, RI (US)

(73) Assignee: Brown University, Providence, RI (US)

( * ) Notice: Subject to any disclaimer, the term of this patent is extended or adjusted under 35 U.S.C. 154(b) by 98 days.

(21) Appl. No.: 12/870,387

(22) Filed: Aug. 27, 2010

(65) Prior Publication Data

US 2011/0053766 A1    Mar. 3, 2011

Related U.S. Application Data

(63) Continuation of application No. 12/919,831, filed as application No. PCT/US2008/079048 on Oct. 7, 2008.

(60) Provisional application No. 61/049,848, filed on May 2, 2008, provisional application No. 61/032,375, filed on Feb. 28, 2008.

(51) Int. Cl.
*C01B 19/00* (2006.01)
*B01D 53/56* (2006.01)
*B01D 47/00* (2006.01)

(52) U.S. Cl.
USPC ................... 423/508; 423/239.1; 423/210

(58) Field of Classification Search
None
See application file for complete search history.

(56) References Cited

U.S. PATENT DOCUMENTS

| 4,274,842 | A | 6/1981 | Lindau |
| 4,530,718 | A * | 7/1985 | Badesha ................. 423/510 |
| 6,717,363 | B2 | 4/2004 | Foust et al. |
| 6,942,840 | B1 | 9/2005 | Broderick |
| 7,250,387 | B2 | 7/2007 | Durante et al. |
| 7,631,758 | B2 | 12/2009 | Stennes et al. |
| 2004/0081605 | A1* | 4/2004 | Peltola et al. ............. 423/210 |
| 2004/0188298 | A1 | 9/2004 | Shatford et al. |
| 2006/0191835 | A1 | 8/2006 | Petrik et al. |

(Continued)

FOREIGN PATENT DOCUMENTS

CN  1480391  * 3/2004
JP  2008184382  * 8/2008

OTHER PUBLICATIONS

Lin, Zong-Hong, et al. "Evidence on the size dependent absorption spectral evolution of selenium nanoparticles". Materials Chemistry and Physics. 92. 591-594 (2005).*

(Continued)

*Primary Examiner* — Melvin C Mayes
*Assistant Examiner* — Sheng H Davis
(74) *Attorney, Agent, or Firm* — Barlow, Josephs & Holmes, Ltd.

(57) ABSTRACT

The present invention is a method and material for using a sorbent material to capture and stabilize mercury. The method for using sorbent material to capture and stabilize mercury contains the following steps. First, the sorbent material is provided. The sorbent material, in one embodiment, is nano-particles. In a preferred embodiment, the nano-particles are unstabilized nano-Se. Next, the sorbent material is exposed to mercury in an environment. As a result, the sorbent material captures and stabilizes mercury from the environment. In the preferred embodiment, the environment is an indoor space in which a fluorescent has broken.

13 Claims, 22 Drawing Sheets

(56) References Cited

U.S. PATENT DOCUMENTS

2007/0007878 A1 1/2007 Lundgren
2008/0112858 A1 5/2008 DeBerry
2009/0095133 A1 4/2009 Maggio
2010/0047146 A1 2/2010 Olson et al.

OTHER PUBLICATIONS

Zhu, Yingjie, et al. "Preparation of Nanometer-size selenium powders of uniform particle size by gamma irradiation". Materials Letters. 28. 119-122 (1996).*

Jang Min, Hong Seung Mo, Park Jae K., "Characterization and recovery of mercury from spent fluorescent lamps", Waste Management, vol. 25 (2005), pp. 5-14, www.sciencedirect.com, www.elseviercom/locate/wasman.

Durao Jr. Walter Alves, deCastro Camila Andreva, Windmoller Claudia Carvalhinho, "Mercury reduction studies to facilitate the thermal decontamination of phosphor powder residues from spent fluorescent lamps" Waste Management vol. 28 (2008) pp. 2311-2319, www.sciencedirect.com, www.elsevier.com/locate/wasman.

Zhang, S-Y et al., Synthesis of selenium nanoparticles in the presence of polysaccharides; Aug. 2004; Elsevier, vol. 58; 2590-2594.

Zhu, Y et al., "Preparation of nanometer-size selenium powders of uniform particle size by gamma-irradiation", Elsevier, Sep. 1996, Materials Letters 28 (1996) 119-122.

* cited by examiner

| Sorbent description | Surface area (particle size) | Hg capture capacity, μg/g at 20°C, 60 μg/m³ Hg |
|---|---|---|
| *Sulfur* | | |
| micro-sulfur (Sigma Aldrich) | 0.3 m²/g (~10 μm) | 0.026 |
| sulfur nanotubes | 30 m²/g (~200 nm) | 0.62 |
| *Metals and metal oxides* | | |
| micro-zinc (Sigma Aldrich) | 0.2 m²/g (4.2 μm) | 0.005 |
| nano-zinc (Sigma Aldrich) | 3.7 m²/g (230 nm) | 0.08 |
| micro-nickel (Sigma Aldrich) | 0.5 m²/g (1.5 μm) | 0.04 |
| nano-nickel (Alfa Aesar) | 15.9 m²/g (43 nm) | 1.5 |
| micro-copper (Sigma Aldrich) | 0.4 m²/g (1.7 μm) | 2.5 |
| nano-copper (Alfa Aesar) | 13.5 m²/g (50 nm) | 31.8 |
| aged nano-copper | see nano-Cu | 71.3 |
| nano-copper-oxide | see nano-Cu | 4.3 |
| nano-silver (Inframat Adv. Mat's) | (30-100 nm by TEM) | 8510 |
| nano-silver, 500°C vacuum annealed | (100-500 nm) | 2280 |
| *Metal sulfides* | | |
| micro-MoS₂ (Sigma-Aldrich) | (< 2 μm) | 7 |
| micro-WS₂ (Sigma-Aldrich) | (< 2 μm) | 25 |
| nano-WS₂ (Nanostructured & Amorphous Materials Inc.) | *30 m²/g (100-500 nm) | 27 |
| *Carbon* | | |
| carbon black (Cabot M120) | 38 m²/g (75 nm) | 0.45 |
| mesoporous carbon (Jian et al., 2008) | 144 m²/g (24 nm pore size) | 1.25 |
| activated carbon 1, undoped** | *900 m²/g | 20 |
| activated carbon 2, undoped** | *550 m²/g | 115 |
| activated carbon 3, S-impregnated (HgR, Calgon Carbon Corp.) | *1000-1100 m²/g | 2600 |
| *Selenium* | | |
| micro-Se (commercial, ground, amorphous) | 0.03 m²/g (10-200 μm) | > 5000 |
| BSA-stabilized amorph. nano-Se | 65 m²/g (6-59 nm) | 616 |
| BSA (alone)*** | -- | 6.3 |
| Glutathione, GSH (alone)*** | -- | 1.3 |
| Glutathione, oxidized, (alone)*** | -- | 0.3 |
| Unstabilized amorph. nano-Se | 9 m²/g (12-615 nm) | 188,000 |
| Commercial products for Hg vapor capture | | |
| Product 1 | (10-200 μm) | 7 |
| Product 2 | (10-200 μm) | 1250 |

\* data provided by manufacturer   \*\* from Manchester et al. (2007)
\*\*\* byproducts of nanoselenium synthesis

Fig. 6

NANOSTRUCTURED SORBENT MATERIALS FOR CAPTURING ENVIRONMENTAL MERCURY VAPOR

CROSS REFERENCE TO RELATED APPLICATIONS

This non-provisional patent application is related to and claims priority from U.S. Non-Provisional patent application Ser. No. 12/919,831 filed Aug. 27, 2010 which is a 371 filing from PCT International Patent Application No. PCT/US08/079,048, filed on Oct. 7, 2008, and claims priority from earlier filed U.S. Provisional Patent Application No. 61/049,848 filed May 2, 2008 and U.S. Provisional Patent Application No. 61/032,375 filed Feb. 28, 2008, all of which are incorporated herein by reference.

BACKGROUND OF THE INVENTION

The present invention generally relates to a method and materials for mercury capture. More specifically, the present invention relates to a method and materials for capturing mercury using sorbent materials.

Mercury is considered by the government to be an air toxic pollutant. Mercury is of significant environmental concern because of its toxicity, persistence in the environment, and bioaccumulation in the food chain. Elemental mercury is volatile and is therefore released as a vapor into the environment from a variety of anthropogenic sources. Atmospheric deposition of mercury is reported to be the primary cause of elevated mercury levels in fish found in water bodies remote from known sources of this heavy metal.

Mercury can enter into the environment through the disposal (e.g., landfilling, incineration) of certain products. Products containing mercury include: auto parts, batteries, fluorescent lamps, medical products, thermometers, flat-panel televisions and thermostats. Due to health concerns, toxic use reduction efforts are cutting back or eliminating mercury in such products. For example, most thermometers now use pigmented alcohol instead of mercury.

Fluorescent lamps are mercury-vapor electric discharge lamps, and most contain from 1 to 10 mg of mercury depending upon the type of fluorescent lamp. Much of the mercury in new lamps is in the elemental state and being volatile can be released into the atmosphere when the fluorescent lamp is broken.

Currently, 300 million CFLs (compact fluorescent lamps) are sold per year. In the U.S., projections suggest that there will be at least 3 billion CFLs in U.S. homes in five years with an ultimate capacity of 4 billion. The main cause for the increase in sale of these CFLs containing mercury is their energy efficiency.

Broken CFLs can pose an immediate health hazard due to the evaporation of mercury into room air. Inhalation exposure is a concern as 80% of inhaled mercury is physiologically absorbed.

Currently, there is no reliable method or device for capturing and stabilizing mercury found in consumer products, such as CFLs. CFLs are being disposed of by consumers by a variety of methods across the United States. Many consumers have the option of disposing of these products in the same way they dispose of other solid waste. The EPA has reported CFLs are being disposed in municipal waste landfill, recycling centers, municipal waste incineration, and hazardous waste disposal.

Most florescent bulb recyclers in the United State employ the dry recycling process which generates four products: mercury-contaminated phosphor powder, mercury-contaminated filters, crushed glass, and aluminum end caps. The dry recycling process is a system which operates under negative pressure to minimize mercury emissions to the atmosphere. The spent CFLs are first broken. During crushing, a vacuum system collects the mercury vapor and the crushed materials including phosphor powder which contains most of the mercury. The mercury vapor is usually captured by carbon filters during crushing. Mercury-contaminated phosphor powder and carbon filters are placed in a retort to vaporize the mercury and collect it for reuse. The separation process employed by most lamp recyclers cannot remove phosphor powder and mercury on lamp glass completely. See M. Jang et al., "Characterization and capturing of mercury from spent fluorescent lamps," Waste Management, Vol. 25 (2005).

Three processes are most important for the decontamination of CFL residues: (i) a thermal process (ii) a chemical process involving lixiviation by aqueous solutions and (iii) stabilization. The complexity of these processs, the necessity of multiple steps, the utilization of chemical reagants, and especially the generation of effluents that require adequate treatment are the disadvantages of these processes. See W. A. Durão Jr. et al., "Mercury Reduction studies to facilitate the thermal decontamination of phosphor powder residues from spent fluorescent lamps", Waste Management (2007).

The U.S. Environmental Protection Agency recommends that, in the absence of local guidelines, fluorescent bulbs be double-bagged in plastic bags before disposal. The used or broken CFLs are placed in two plastic bags and put it in the outside trash, or other protected outside location, for the next normal trash collection. However, the double-bagging of broken CFLs will not prevent the release of mercury vapor into the air when the bulbs are compromised according to recent data from the Maine Department of Environmental Management.

In addition, there is no reliable and efficient method for cleaning up accidentally broken CFLs in a consumer's home. Today, if a CFL is broken, the shards of glass can be picked up by hand but some mercury-containing phosphor typically spills onto the surface causing the breakage site to continue to emit mercury into the air for hours or days causing a potential health risk, especially in the case of pregnant women or young children.

It would therefore be desirable to provide a method of safely and effectively disposing of mercury-containing products, such as CFLs. In addition, there is a need to capture and stabilize volatile mercury to prevent its release into room air when consumer products such as CFLs are broken. Finally, there is a need to provide materials or methods to allow for the safe disposal of the various pieces of broken consumer products such as CFLs.

BRIEF SUMMARY OF THE INVENTION

An embodiment of the present invention preserves the advantages of prior art methods and materials for mercury capture and stabilization. In addition, it provides new advantages not found in currently available methods and materials of mercury capture and stabilization and overcomes many disadvantages of such currently available methods and packaging materials for mercury capture and stabilization.

The present invention is a method and material for using sorbent materials to capture and stabilize mercury. The packaging materials or package contains sorbent materials to capture and stabilize mercury. The sorbent materials may be nano-particles or other materials used to capture and stabilize mercury. The nano-particles are selected from a group consisting of: nano-Cu, nano-Ag, nano-Se, nano-S, nano-Ni, nano-Zn, nano-WS$_2$ or any nano-particle used for the capturing of mercury. In a preferred embodiment, the nano-particles are unstabilized, colloidal nano-Se. Other materials that may be used as sorbent material include micro-scale powder, solutions, soluble compounds, activated carbon, S-impregnated activated carbon, or other impregnated or chemically modified activated carbon products.

The package or packaging for products containing mercury having sorbent materials effective for capturing and stabilizing mercury and a carrier material which forms a part of a package. The sorbent materials are carried on the carrier material. It is also desirable to position the sorbent materials in a location advantageous for capturing and stabilizing mercury vapor emitted from the product.

The package or packaging material contains a carrier material. The carrier material may either be a porous or non-porous solid, or a gel or solvent. For example, the carrier material may be a liner within the package. In one embodiment, the carrier material may be selected from a group consisting of: cardboard, textiles, Styrofoam, paper, and plastic. It should be noted that this list is not exclusive and there are additional materials used as a carrier material.

The carrier material will contain sorbent material. For example, the carrier material is impregnated, coated, sprayed, injected, dipped, or dispersed with the sorbent material. In addition, the packaging may contain a protective layer for preventing contact with the sorbent material by a user. The protective layer lies between the sorbent material of the packaging and the points of potential contact with consumers and users.

A packaging is used for bulbs containing mercury. The packaging for bulbs may contain an active layer and a barrier layer. The active layer has a top surface and a bottom surface. The active layer contains sorbent materials for capturing and stabilizing mercury. A barrier layer has a top surface and a bottom surface. The barrier layer is a non-porous material situated on the top surface of the active layer to prevent the passage of mercury across the barrier layer.

Optionally, a protective layer may underlie the bottom surface of the active layer. The protective layer is a porous material to prevent contact with the sorbent material of the active layer. When the bulb releases mercury, the mercury is absorbed or reacts with the sorbent material of the active layer and the barrier layer prevents the release of the mercury giving time for the reaction with the sorbent materials.

A method for using packaging containing sorbent material to capture and stabilize mercury contains the following steps. First, a packaging is provided that contains sorbent materials for capturing of mercury. Second, the packaging is positioned over the mercury spillage site or breakage site to capture and stabilize the mercury. As a result, the sorbent material of the packaging absorbs the mercury. The advantage of using packaging as the vehicle for distributing the sorbent material is that it is part of existing product flows and is distributed with the products that may cause the exposure.

In another embodiment, a kit containing items having sorbent materials may be provided to capture and stabilize mercury. The items are selected from a group consisting of: cloth, bags, packaging, package, linings, gloves, paper towels, cardboard, squeegee, eyedropper, duct tape, shaving cream, paint brush, flashlight, sorbent materials in powdered form, and combinations thereof.

The method for using sorbent materials to capture and stabilize mercury contains the following steps. First, the sorbent material is provided. The sorbent material, in one embodiment, is nano-particles selected from a group consisting of: nano-Cu, nano-Ag, nano-Se, nano-S, nano-Ni, nano-Zn, and nano-WS$_2$ or any material used for the capturing of mercury. In a preferred embodiment, the nano-particles are unstabilized, colloidal nano-Se.

The sorbent material is provided in different forms. In one form, the sorbent materials are a powder used for dispersing onto a mercury spillage site. In another embodiment, the sorbent materials are impregnated, coated, sprayed, dispersed, dipped, or injected onto a carrier material. The carrier material may be either a non-porous or porous carrier material, such as cardboard.

Next, the sorbent materials are exposed to mercury in an environment. The environment can be either indoors or outdoors. For example, the indoor environment may be a building, office, dentist's office, laboratory, recycling center, store, residential or commercial building, warehouse, shipping vessel, shipping container, recycling center, container, packaging, storage space, and vehicle or any other environment where mercury is found. For the outdoor environment, it may be a landfill, stadium, office park, or any other outdoor environment where mercury is found. When the sorbent materials are exposed to mercury, the nano-particles capture and stabilize mercury of the environment.

It is therefore an object of the present invention is to provide a method using sorbent materials to capture and stabilize mercury.

It is a further object of the present invention is to provide sorbent materials on a carrier material to capture and stabilize mercury.

Another object of the present invention is to provide a packaging of a product that contains sorbent material for capturing and stabilizing mercury in that product.

A further object of the present invention is to provide a product containing sorbent material for capturing and stabilizing mercury.

Other objects, features and advantages of the invention shall become apparent as the description thereof proceeds when considered in connection with the accompanying illustrative drawings.

BRIEF DESCRIPTION OF THE DRAWINGS

The novel features which are characteristic of the method for mercury capturing are set forth in the appended claims. However, the method for mercury capturing, together with further embodiments and attendant advantages, will be best understood by reference to the following detailed description taken in connection with the accompanying drawings in which:

FIG. 6 is a table of low-temperature mercury vapor sorbents;

DETAILED DESCRIPTION OF THE PREFERRED EMBODIMENTS

The embodiment is generally directed to a novel and unique method and material for capturing and stabilizing mercury. In particular, the present invention is a method and material containing sorbent materials to capture and stabilize mercury. The method and packaging material of the present invention provides a safe and effective disposal of the mercury contained within products.

The present invention is a method and material for using sorbent materials to capture and stabilize mercury. The packaging materials or package contains sorbent materials to capture and stabilize mercury. The sorbent materials may be nano-particles or other materials used to capture and stabilize mercury. The nano-particles are selected from a group consisting of: nano-Cu, nano-Ag, nano-Se, nano-S, nano-Ni, nano-Zn, nano-WS$_2$ or any nano-particle used for the capturing of mercury. In a preferred embodiment, the nano-particles are unstabilized, colloidal nano-Se. Other materials that may be used as sorbent material include micro-scale powder, solutions, soluble compounds, activated carbon, impregnated activated carbon, or other impregnated or chemically modified activated carbon products.

In a preferred embodiment, the nano-particles are unstabilized, colloidal nano-Se. The nano-particles capture and stabilize mercury from the environment when exposed to the mercury vapor. With regard to nano-Se, it is known in the art the following chemical reaction:

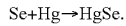

$$Se + Hg \rightarrow HgSe.$$

Based upon the experiments shown below, colloidal, unstabilized nano-Se capture and stabilizes mercury better than any other nano-particle.

The package or packaging for products which contain mercury contains sorbent materials effective for absorbing and reacting with mercury and a carrier material which forms a part of a package. The sorbent materials are carried on the carrier material. It is also desirable to position the sorbent materials in a location advantageous for absorbing mercury vapor emitted from the product. The package or packaging for products may also serve to temporarily contain the mercury or block its dispersion into room air so that it can be captured and stabilized by the sorbent material.

The carrier material has many different forms. The carrier material may either be porous or non-porous material. For example, the carrier material may be a liner within the package. The carrier material may be selected from a group consisting of: cardboard, textiles, Styrofoam, paper, and plastic. The material is impregnated, coated, sprayed, injected, dipped, or dispersed with the sorbent materials. In addition, the packaging may contain a protective layer for preventing contact with the sorbent materials by a user. The protective layer underlies the sorbent materials of the packaging.

Figure 1:
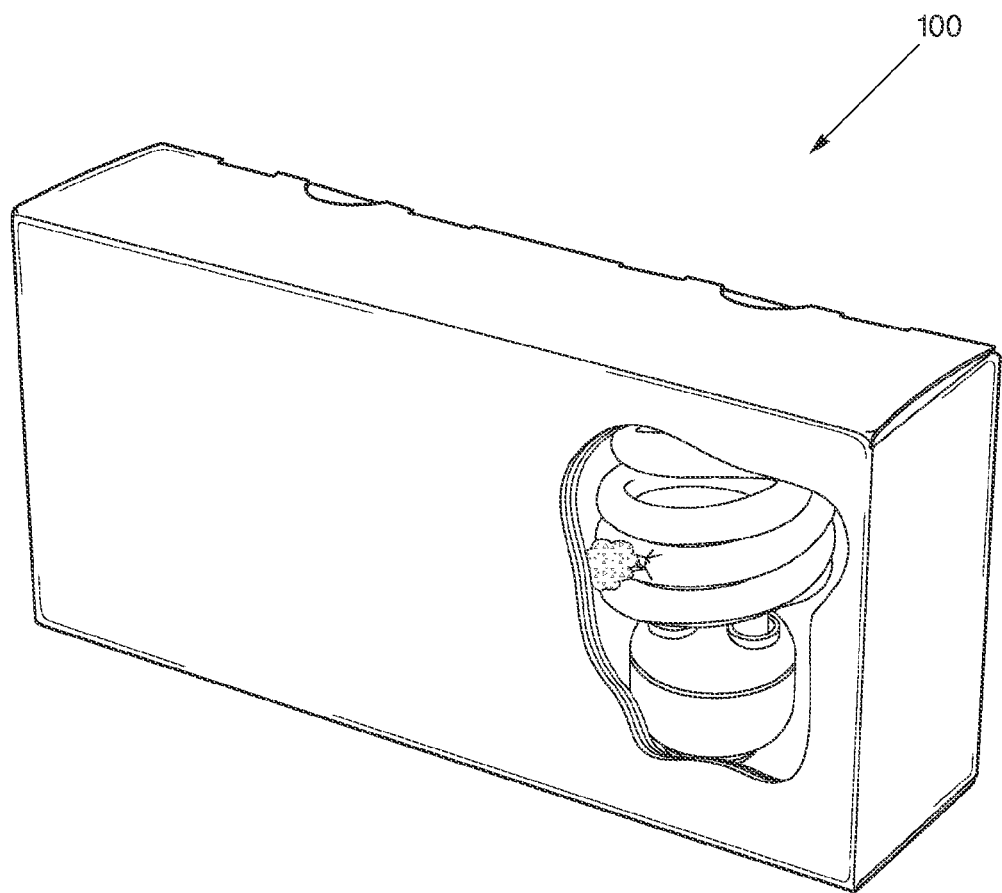
FIG. 1 is a perspective view of packaging for bulbs containing sorbent materials.

For example, the package 100 is used for bulbs containing mercury as shown in FIG. 1. More specifically, fluorescent bulbs are known to contain mercury, such as CFLs. It is contemplated that the sorbent materials may be used in packaging for fluorescent bulbs, separate sheets or linings in the packaging for fluorescent bulbs, or bags lined with sorbent materials contained within the fluorescent bulbs.

The packaging 100 includes porous and non-porous materials. For example, the packaging may include linings, bags, containers, blankets, cloths (FIG. 22), pouches, cardboard, and any other material used in packaging a product or good. For example, a porous cloth (FIG. 22) is dipped into sorbent material solution. When the porous cloth is sufficiently dried, the cloth can be placed over mercury spillage sites to capture and stabilize mercury. In a preferred embodiment, the packaging includes both a porous layer containing sorbent material and a non-porous layer to prevent mercury from diffusing through and away while a reaction takes place with the sorbent material.

Figure 2A:
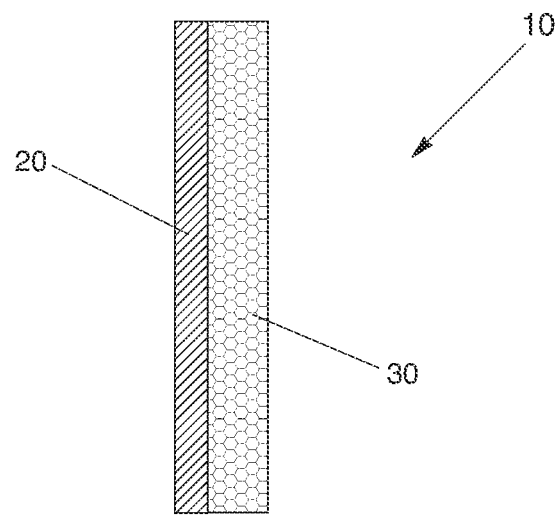
FIG. 2A is a cross-sectional view of packaging containing sorbent materials to capture and stabilize mercury.
Figure 2B:
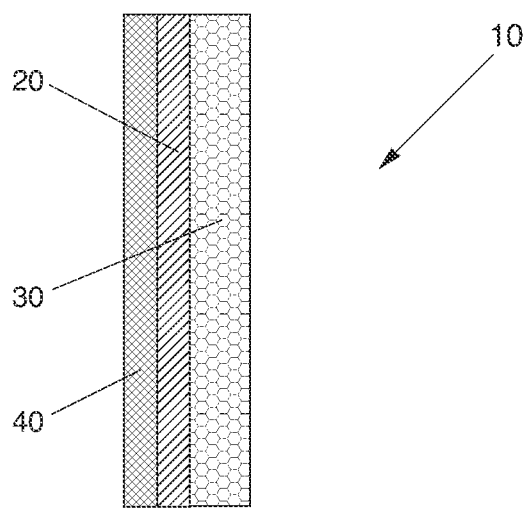
FIG. 2B is a cross-sectional view of packaging containing sorbent materials to capture and stabilize mercury.

Referring to FIGS. 2A-2B, the packaging material 10 for the bulbs contains multiple layers 20, 30, 40. It should be noted the packaging for bulbs may contain at least one active layer 20 containing sorbent materials to capture and stabilize mercury. Referring to FIG. 2A, the packaging material for bulbs may contain an active layer 20 having a top surface and a bottom surface and containing the sorbent material. The packaging material 10 may also include a barrier layer 30 which has a top surface and a bottom surface. The barrier layer 30 has a non-porous carrier material and is situated on the top surface of the active layer 20 to preventing the diffusion or flow of mercury through the multi-layer structure. The barrier layer 30 prevents the passage of mercury to allow time for reaction with the sorbent material of the active layer 20.

Referring to FIG. 2B, a protective layer 40, optionally, may underlie the bottom surface of the active layer 20. The protective layer 40 contains a porous carrier material to prevent contact with the sorbent material of the active layer 20. When the bulb releases mercury, the mercury is absorbed or reacts with the sorbent material of the active layer 20 and the barrier layer 30 prevents the release of the mercury giving time for the reaction with the sorbent materials.

Figure 3:
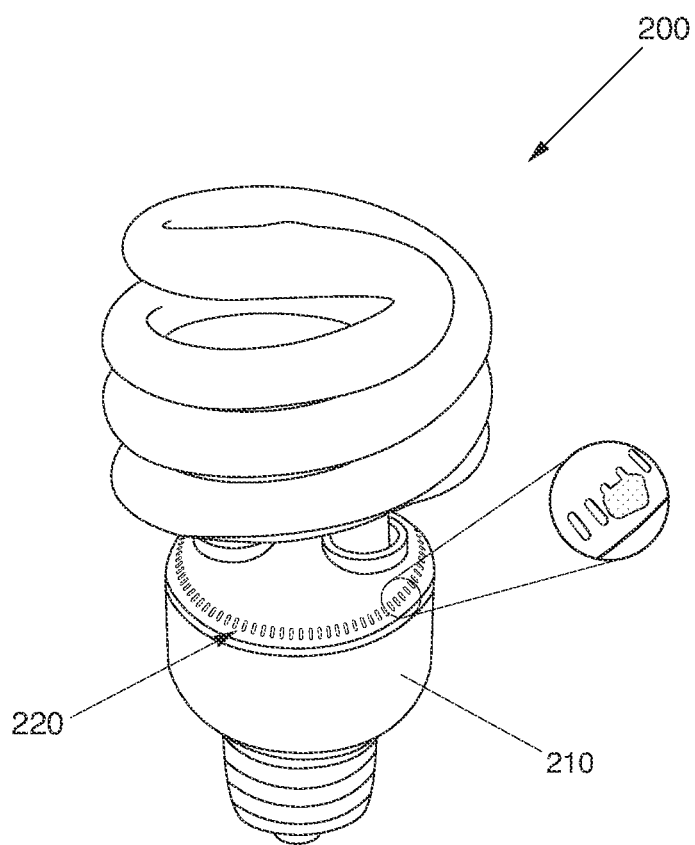
FIG. 3 is a perspective view of a bulb containing sorbent materials.

Referring to FIG. 3, a bulb 200 may also contain sorbent materials near a bottom portion of the bulb to capture and stabilize the mercury. In this embodiment, the sorbent materials are contained underneath the bottom plastic cap 210 of the bulb 200. The plastic cap 210 defines holes 220 for allowing mercury to contact the sorbent materials.

Experiments were conducted to measure the adsorption capacity of each of the sorbent materials. Adsorption or capturing capacities of nano-particles range over seven orders of magnitude, from 0.005 ug/g (Zn micropowder) to >188,000 ug/g (unstabilized nano-Se) depending on sorbent chemistry and size. Unstabilized nano-selenium in two forms (dry powder and impregnated cloth) was used in an experiment for the in situ, real-time suppression of Hg vapor escape following CFL fracture.

Materials and Methods For Adsorption Capacities of Nano-Particles Compact Fluorescent Lamps and Hg Release Characteristics Two different brands of compact fluorescent lamps were purchased commercially: a 13W and 9W device containing 4.54 mg and 5.0 mg of mercury respectively. To characterize the release of Hg vapor under ambient conditions, the bulbs were catastrophically fractured inside a flexible Teflon cylinder and the Hg vapor transported away by a metered flow of nitrogen passed to a gold amalgamation atomic fluorescent vapor-phase mercury analyzer (PSA model 10.525). Additional experiments were carried out on used bulbs at the point of burnout collected from residences and retail recycling centers. In addition, proof-of-principle experiments demonstrating in situ capture were carried out using various sorbents.

A test sorbent material was added to the Teflon cylinder along with the CFL, the bulb fractured, and the system sealed for 24 hours to simulate containment in a dedicated disposal bag or modified retail package. At the end of this period, nitrogen flow was initiated and the effluent gas was analyzed for Hg vapor release.

Sorbents

A variety of carbon materials were used in this study including Darco FGL activated carbon (Norit, 550 m2/g), a granulated activated carbon from Alfa Aeser (900 m2/g), Cabot M-120 carbon black (38 m2/g) a sulfur impregnated carbon sample (HgR, Calgon Carbon, 1000-1100 m2/g) and a mesoporous carbon (144 m2/g). All surfaces areas are BET values measured at Brown (Autosorb-1, Quantachrome Instruments) or supplied by manufacturer.

Sulfur nanotubes were synthesized at Brown by dipping 200 nanometer channel aluminum templates in a 50 mass-% solution of Sigma Aldrich 100 mesh commercial sulfur and CS2. The loaded templates were dried and excess sulfur removed from the template top with a razor blade. The aluminum templates were etched overnight with 2M NaOH solution. The S-nanotube samples were washed twice with 1 M NaOH, twice with 0.5M NaOH and four times with DI water followed by centrifugation and oven drying at 60° C.

Copper, both micro- and nanoscale metal particles, were obtained from Sigma Aldrich (<10 μm) and Alfa Aesar (20-40 nm, 13 m2/g) respectively. Nickel microsized metal powder was obtained from Sigma-Aldrich (~3 μm diameter). Nickel nanoparticles were obtained from Alfa Aesar (15-625 nm, 15.9 m2/g). Zinc metal powders were obtained from Sigma-Aldrich (microproduct<10 μm and nanoproduct<50 nm, 3.7 m2/g). Silver nanoparticles were obtained from Inframat Advanced Materials (100-500 nm and 1.2 m2/g as received).

All the metal powders were studied shortly after unpacking unless noted as processed in some way. Microsized molybdenum sulfide and tungsten sulfide powders were obtained from Sigma Aldrich (both <2 μm). Tungsten disulfide nanoparticles were obtained from Nanostructured & Amorphous Materials, Inc. (BET area of 30 m2/g).

Amorphous nanoselenium was prepared using a 4:1 molar mixture of glutathione (GSH, reduced form, TCI America) and sodium selenite (Na2SeO3, Alfa Aesar) solution. Glutathione reduces sodium selenite to form seleno-diglutathione (GSSeSG), which decomposes to elemental selenium as upon sodium hydroxide titration. In the presence of bovine serum albumin (BSA, Sigma-Aldrich) the reaction gives a stabilized nanoselenium dispersion. For mercury capture experiments, the solutions of nanoselenium were divided in 1.5-2 ml aliquots and freeze dried to prevent any thermal effects of heat drying. The nanoselenium samples were palletized by centrifugation (13,000 rpm, 10 min) before freeze-drying. These freeze dried aliquots and Seimpregnated cloth, which was prepared by soaking a 15"×17" Kimwipe in the amorphous nanoselenium solution and dried at room temperature, were used for the in-situ mercury release experiments. A commercial selenium sample was obtained in the form of pellets (J. T. Baker) and crushed to obtain Se powder of 2-200 μm.

Mercury Adsorption Capacity Measurements

Elemental mercury vapor was generated in Ar (300 cc/min) at 60±3 μg/m3 using the Hg CAVKIT 10.534 (PS Analytical, Ltd) and passed through a fixed bed of sorbent resting on a Pyrex fritted disk inside a tubular Pyrex reactor. The exit Hg concentration was monitored semi-continuously (3.8 min sampling time) by atomic fluorescence using the Sir Galahad II (PS Analytical, Ltd).

Results and Discussion

Figure 4A:
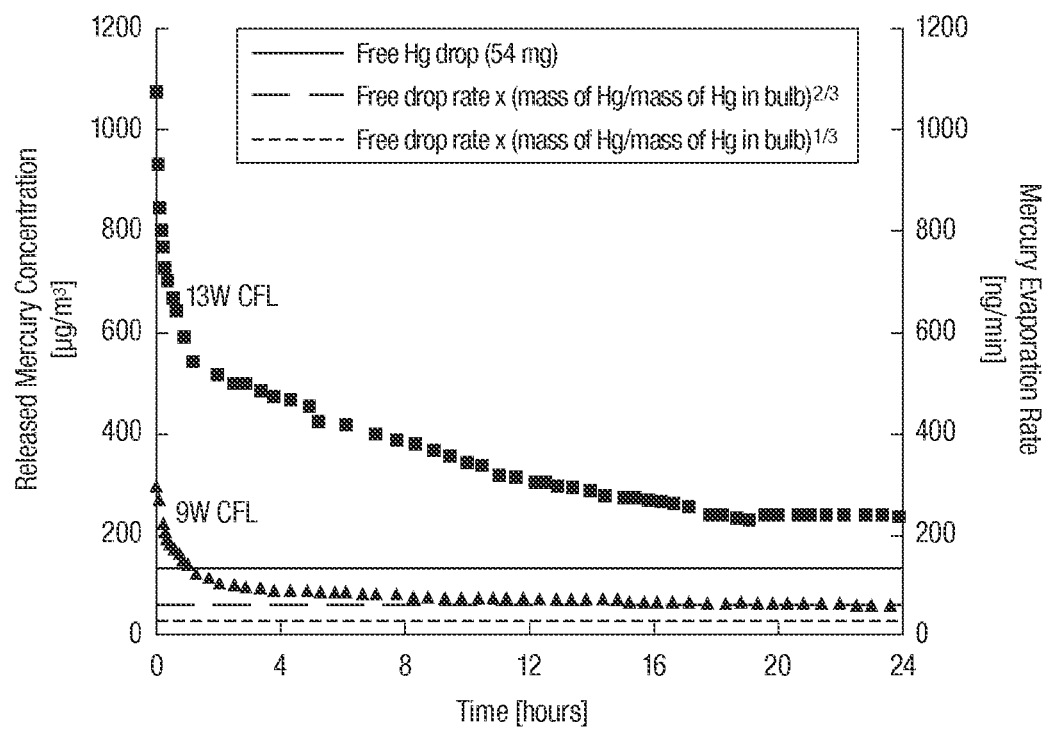
FIG. 4A is graph showing mercury vapor release characteristics for two brands of compact fluorescent lamps.
Figure 4B:
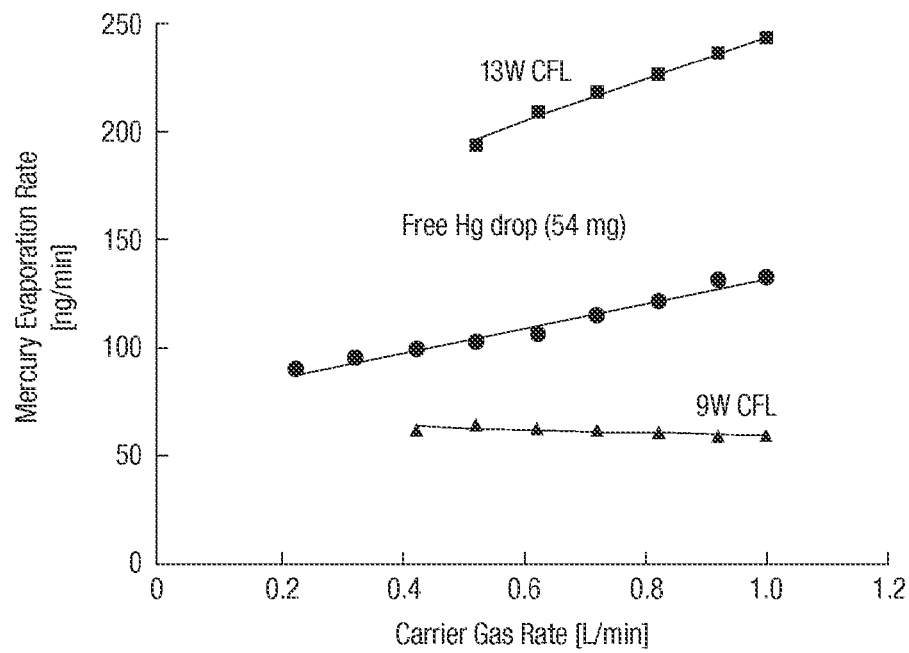
FIG. 4B is a graph showing mercury evaporation rate as a function of gas flow rate over the compact fluorescent lamps.

FIGS. 4A-4B shows time-resolved mercury release data from two CFL models. The release is initially rapid producing vapor concentrations from 200-800 μg/m3 during the first hour, which far exceed the OSHA occupational limits. The release decays on a time scale of hours and continues at significant rate for at least four days (data beyond 24 hrs not shown). It has been suggested that the initial high rate is due to Hg existing in the lamp vapor phase, but a simple calculation shows this to be impossible. Saturated Hg vapor (15,000 μg/m3) in a typical lamp volume (50 ml) corresponds to only 0.65 μg of vapor phase Hg, which is much less than the actual mercury release during the first hour, 12-43 μg. The majority of Hg in a CFL must be in a condensed phase and mercury release from CFLs is primarily due to desorption/evaporation phenomena involving this condensed-phase mercury. FIGS. 4A-4B also compares the actual CFL release with the evaporation of a free Hg droplet under the same set of conditions. The actual CFL release exceeds the release from a free Hg droplet of equal mass (see FIG. 4A-4B), which likely reflects the much larger surface area of the adsorbed phase (on the phosphor, end caps, and/or glass) relative to the single drop.

Referring to FIGS. 4A and 4B, mercury vapor release characteristics for two brands of compact fluorescent lamps following catastrophic fracture at room temperature. A: Hg vapor concentrations and release rates compared to evaporation from a free mercury drop. The free drop release rate is corrected for differences in the Hg mass between the drop and the bulb for two limiting cases: convective mass transfer at constant mass transfer coefficient (rate~Area~mass2/3) and diffusion dominated mass transfer from a drop (rate~K*Area~mass1/3). The total Hg released after 24 hrs is 504 μg (13 W model) and 113 μg (for 9 W) by integration, which are 11.1% and 1.9% of the total Hg content specified by the vendors, respectively. Over 4 days (extended data not shown) the 13W bulb released 1.34 mg or 30% of the total Hg. B: Mercury evaporation rate as a function of gas flow rate over the broken lamp showing a weak influence of convection.

Similar release patterns but lower amounts were seen for spent bulbs (example result: 90 μg in 24 hrs) or from the fracture site of a new bulb after glass removal to simulate cleanup. Removing large glass shards by hand after breakage on a carpet, did not eliminate Hg release, but reduced it 67% relative to the data in FIG. 4A-4B. The remaining (33%) release from the fracture site is believed to be primarily associated with spilled phosphor powder, which is known to be the primary site for adsorbed Hg partitioning in fresh bulbs.

Sorbent Synthesis, Characterization and Testing

Figure 5:
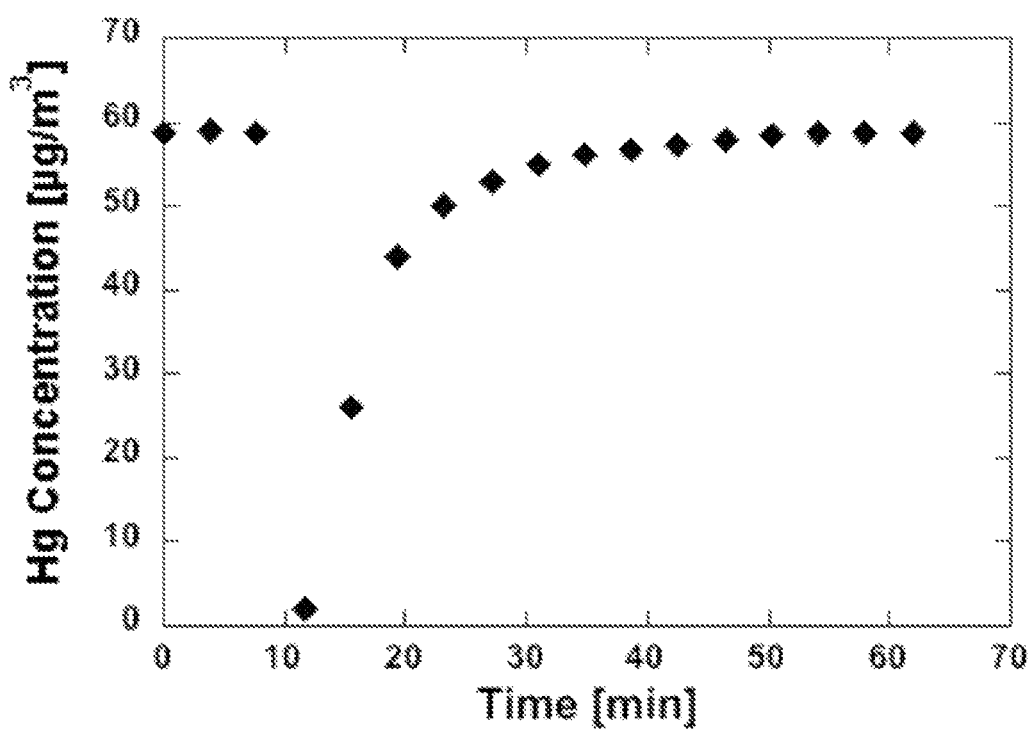
FIG. 5 is a graph shows a curve for fixed-bed sorbent evaluations experiments.

Because mercury vapor capture on solids occurs by adsorption or gas-solid reaction where kinetics and/or capacities typically depend on surface area, we hypothesized that high-area, nanoscale formulations of common mercury sorbents (involving carbon, sulfur, metals, sulfides, and selenium) will show enhanced performance This section evaluates a large set of new nanomaterial sorbents for ambient temperature Hg vapor capture and compares their performance to conventional microscale formulations of the same materials. FIG. 5 shows an example breakthrough curve that is the raw output of the fixed-bed sorbent tests. Integrating the area between the baseline inlet (60 μg/m3) and the outlet concentration curve and dividing by sorbent mass yields a capacity reported in μg-Hg/g-sorbent.

Referring to FIG. 5, an example breakthrough curve in our fixed-bed sorbent evaluation experiments is shown. Time scales range from 20 minutes to 184 hrs depending on specific behavior of the sorbent in question.

FIG. 6 shows a complete list of the sorbents and their Hg capacities under our standard conditions (60 μg/m3 inlet stream), and the following sections discuss the results by sorbent class.

Here we choose a convenient templating route to obtain small quantities of nanostructured sulfur for sorbent testing. FIG. 8 shows the morphology and sorption behavior of sulfur nanotubes fabricated by spontaneous infiltration of CS2/S solutions into nanochannel alumina templates followed by solvent evaporation and chemical etching of the template. The sulfur nanotubes show a 90-fold increase in surface area and a 24-fold increase in Hg capacity over conventional powdered sulfur. The total captured Hg is much less than the HgS stoichiometric limit and much less than even surface monolayer capacity, and the capacities increase with increasing temperature. These results indicate a kinetically-limited chemisorption/reaction on active sites that represent a small fraction of the nanotube surfaces.

Metals and Metal Sulfides

Figure 7:
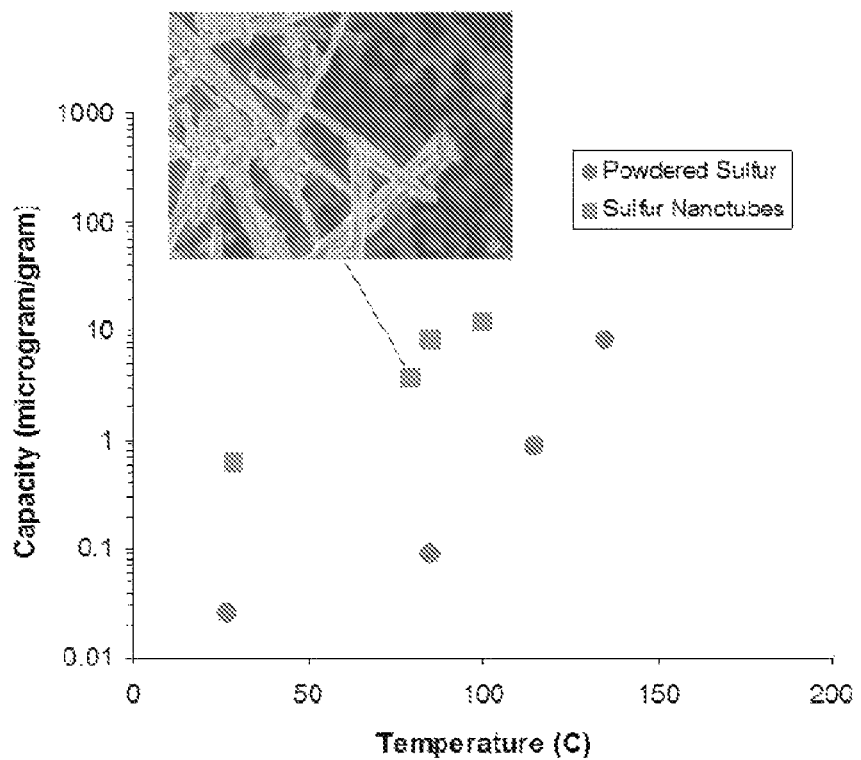
FIG. 7 is a graph showing standard Hg adsorption capacities for elemental sulfur nanotubes and sulfur powder as a function of adsorption reaction temperature.

Here we experiment with available nanoparticles as room temperature Hg sorbents and compare them to conventional microscale powders (see FIG. 7). Mercury capacities vary greatly with chemistry (Ag>Cu>Ni>Zn) and for each metal are significantly enhanced by nanosynthesis. The rank order parallels the standard free energies for metal oxidation, $nM+1/2O_2 \rightarrow MnO_2$ (Ag2O: $\Delta G°$ f=−9.3 kJ/mol; CuO: $\Delta G°$ f=−133.5 kJ/mol; NiO: $\Delta G°$ f=−216 kJ/mol; ZnO: $\Delta G°$ f=−318.5 kJ/mol) and (complete) oxidation of copper is shown to greatly reduce its sorption activity (31.8 to 4.3 μg/g).

Interestingly, copper metal activity is observed to increase modestly as the fresh metal nanoparticles age in the atmosphere, which may suggest elevated activity for partially oxidized surfaces. The nanometal capacities represent from about 10-6 (Zn) to 35% (Ag) of theoretical monolayer coverage on the nominal outer surfaces indicating that the process is far from reaching stoichiometric alloy formation—even in an outer shell—and the reactions are limited to specific active surface sites under these low temperature conditions. Among these metal sorbents, nano-silver (see FIG. 4) is potentially attractive as a high-capacity sorbent (capacities up to 8510 μg/g) for room temperature applications like CFL capture. Annealing nano-silver reduces both its surface area and Hg capture capacity (FIGS. 8A-8B and FIG. 6).

Figure 8A:
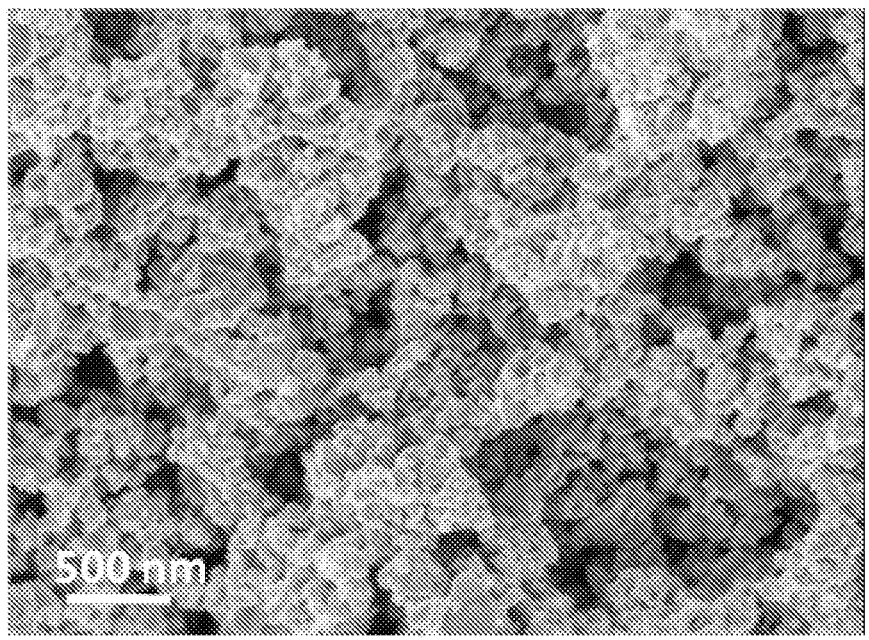
FIG. 8A is an SEM micrograph of nano-silver particles before vacuum annealing at 500 degrees Celsius.
Figure 8B:
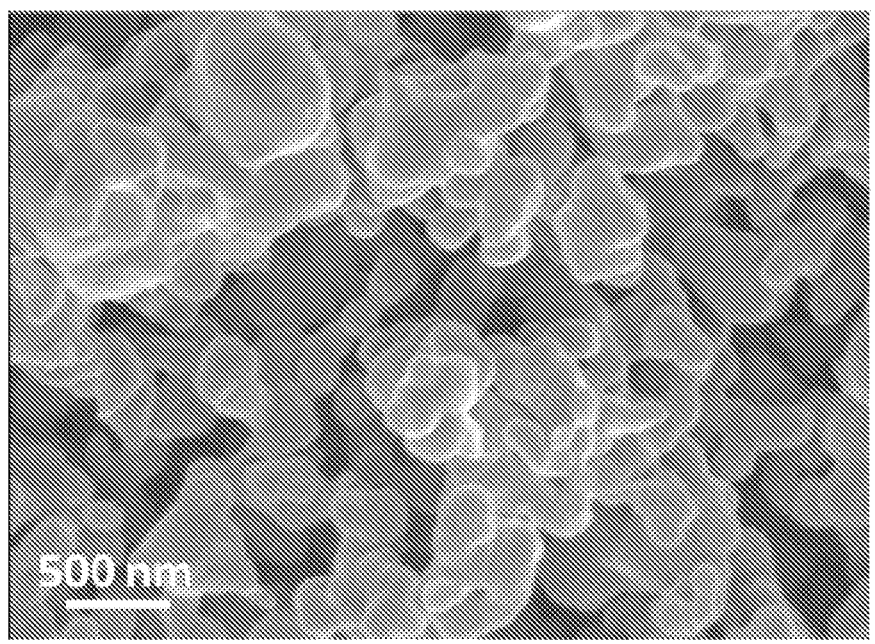
FIG. 8B is an SEM micrograph of nano-silver particles after vacuum annealing at 500 degrees Celsius.

Referring to FIGS. 8A-8B, SEM images of nano-silver particles before (FIG. 8A) and after (FIG. 8B) vacuum annealing at 500° C. In preliminary experiments we found WS2 to be significantly more reactive than MoS2 (both conventional powders) and therefore were motivated to test WS2 nanoparticles as potential high-capacity sorbents. In this case nanosynthesis offered no significant advantage and none of the metal sulfides appear among the most active and useful low-temperature sorbents in FIG. 6.

Carbon Materials

Activated carbons are widely used to capture mercury vapor and their performance can be enhanced by surface modification with sulfur, halogen, or oxygen-containing functional groups. Mercury capture on carbon is a combination of physical adsorption (dominant on unmodified carbons at low temperature) and chemisorption (dominant at elevated temperature or on chemically modified carbons). Because carbons are capable of developing extensive internal surface area, there is little motivation to enhance the external surface area through nanosynthesis methods. Here we evaluate carbons as readily available reference materials that are market relevant benchmarks for the new nanosorbents. FIG. 6 shows low to modest capacities on carbons (0.45-115 μg/g) with the exception of the S-impregnated material (2600 μg/g) which after selenium (see next section) is the best commercially available sorbent in this study.

Selenium

Selenium has an extremely high affinity for mercury. In the body it sequesters mercury into insoluble and metabolically inactive mercury selenides and by this mechanism is protective against mercury neurotoxicity. Its antioxidant nature helps to protect against mercury induced DNA damage. In the environment the stable sequestration of mercury by selenium may reduce its mobility, bioavailability, and eco-toxicity. Strong Hg/Se binding may be key to understanding the biological and environmental behavior of both mercury and selenium. There are few published studies of selenium-based mercury vapor capture, though selenium has been used in Hg removal from off gases in sulfide ore processing and is being considered for Hg stockpile stabilization and long-term storage. The presumed capture mechanism is reaction to HgSe ($\Delta G°$ f=−38.1 kJ/mol). Here we focus on amorphous nanoselenium, which has received recent attention in chemoprevention, but has not to our knowledge been used for Hg vapor capture at low temperatures. FIGS. 10A-10C shows the colloidal synthesis of nanoselenium, the particle size distributions, and the mercury capture behavior of competing Se forms. The original synthesis method uses glutathione (GSH) as a reductant and bovine serum albumin (BSA) as a surface stabilizing agent to achieve very small particles in colloidal suspension. Surprisingly the BSA-stabilized nano-Se has a lower capacity than conventional Se powder despite much smaller particle size (6-60 nm vs. 10-200 μm). We hypothesized that the protein stabilizer (BSA) either blocked Hg access to the Se surfaces or chemically passivated the surfaces through Se-thiol interactions. We therefore removed the BSA to make "unstabilized nano-Se," which FIGS. 10A-10C shows to have a remarkably high Hg sorption capacity and much faster kinetics than conventional micro-Se. Mercury uptake continues over very long times, and a 184 hr experiment was necessary to approach the end state, at which point the unstabilized nano-Se had adsorbed 188,000 µg-Hg/g or approximately 20% Hg/Se mass ratio. XRD analysis shows both the micro-Se and unstabilized nano-Se are amorphous in agreement with the conventional wisdom that elemental selenium obtained by colloidal route is amorphous. Interestingly, there is a region of increasing capture rate indicating an autocatalytic behavior for both the Se micropowder and the unstabilized nanoselenium.

Figure 9A:
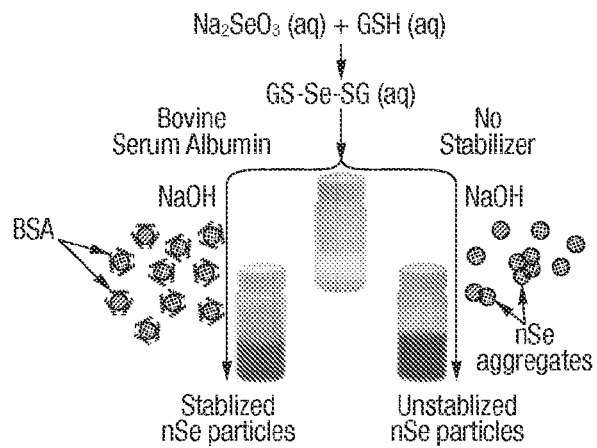
FIG. 9A is an illustration depicting colloidal synthesis of BSA-stabilized nano-SE (left) and unstabilized nano-SE (right)
Figure 9B:
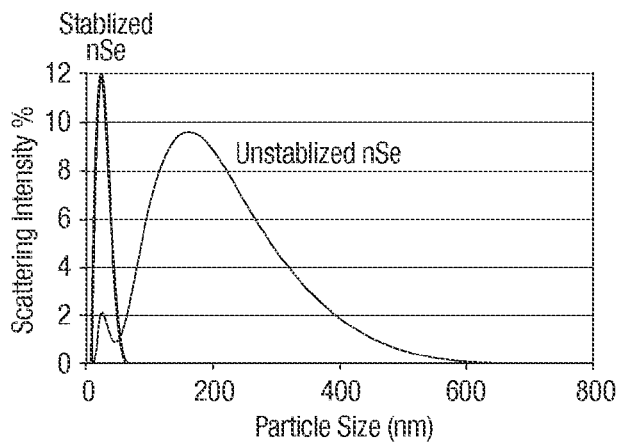
FIG. 9B is a graph showing particle size distributions in aqueous media by dynamic light scattering.
Figure 9C:
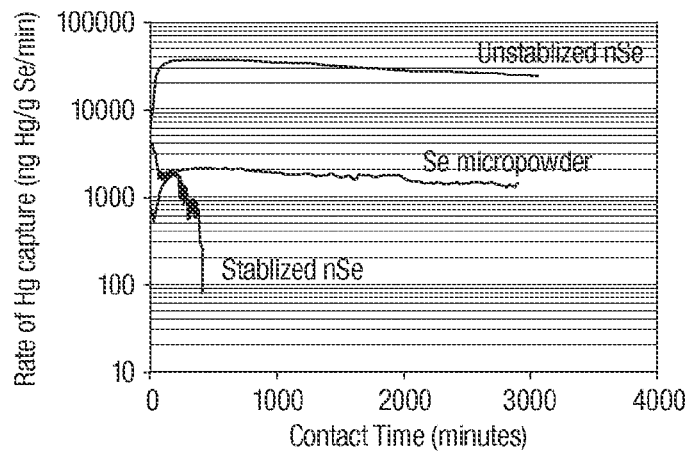
FIG. 9C is an graph showing Hg-uptake kinetics under standard conditions.

Referring to FIGS. 9A-9C, synthesis, particle size distributions, and Hg-uptake kinetics of competing forms of selenium. A: colloidal synthesis of BSA-stabilized (left) and unstabilized (right) nano-Se. B: Particle size distributions in aqueous media by dynamic light scattering, C: Hg-uptake kinetics under standard conditions (60 µg/m3).

Comparison of Sorbents

Figure 10:
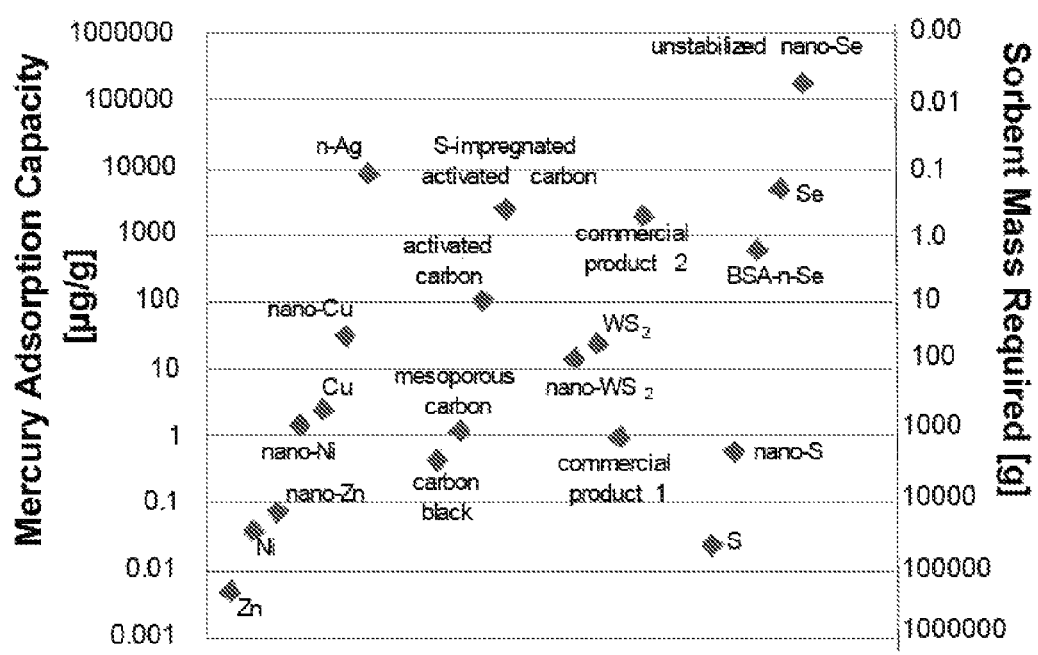
FIG. 10 is a graph comparing mercury adsorption capacity of the sorbents.

FIG. 10 shows a comparison of the new and reference sorbents in this study. The right-hand axis gives the amount of sorbent required to capture 1 mg of Hg vapor, typical of CFL release. Some common sorbents such as powdered S or Zn require enormous amounts of material (>10 kg!) to treat the vapor release from a single CFL and most of the sorbents require amounts that are not attractive for incorporation into consumer packaging (>10 g). A small number of sorbents (nano-Ag, S-impregnated activated carbon and two selenium forms) have capacities that should allow <1 g of sorbent to be used. The most effective sorbent is unstabilized nano-Se, which can capture the contents of a CFL with amounts less than 10 mg. This capacity corresponds to about five monolayer equivalents indicating significant subsurface penetration of mercury into selenium nanoparticles (unlike the other sorbents). The capacity is still only about 7% of the bulk stoichiometric conversion to HgSe, however, indicating the potential for further capacity improvement within the Se-based sorbent systems.

Referring to FIG. 10, a comparison of the best-in-class sorbents in this study: left axis: standard Hg adsorption capacity; right axis: amount of sorbent required for capture of 1 mg Hg vapor typical of the total release from a single CFL over a three-day period.

In Situ Capture of CFL Mercury

Although the amount of Hg released from CFLs on fracture is small (typically <1 mg), some sorbents have sufficient capacity to sequester it all at room temperature for practical application (see FIG. 10). For in situ capture where the sorbent is supplied to consumers in the form of a safe disposal bag, impregnated cloth, or modified retail package, only nano-Ag, selenium forms or sulfur-impregnated activated carbon could be used in reasonable quantities. The concept of in situ capture is demonstrated below, here "treatment" is defined as sealing the fractured CFL and sorbent in a confined space for 24 hours, then removing the sorbent and measuring the residual vapor release.

Figure 11:
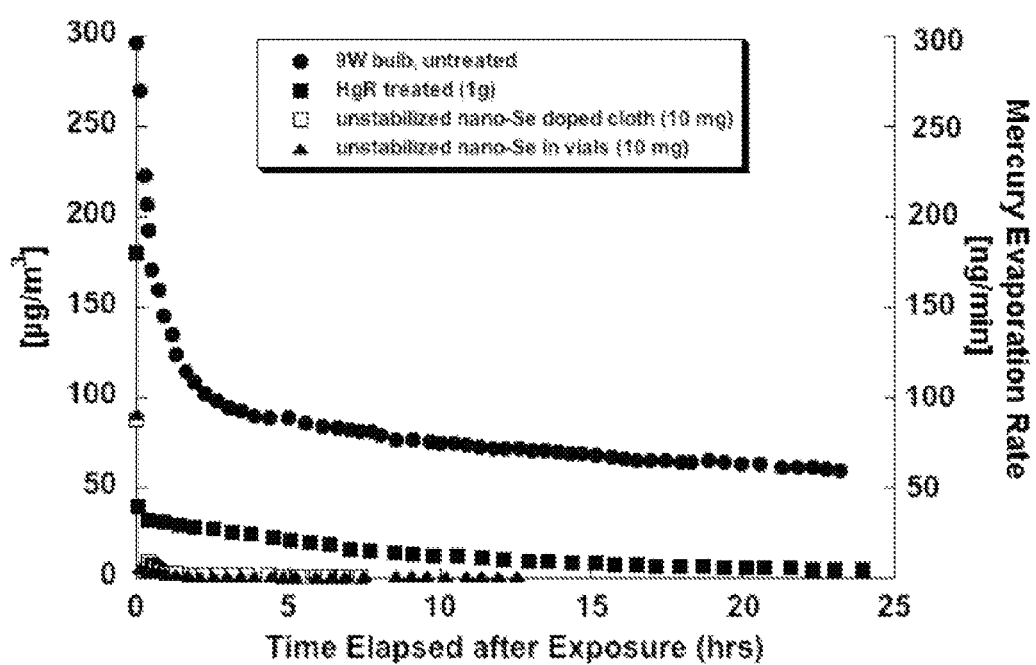
FIG. 11 is a graph showing effect of in situ sorbents on mercury vapor release following fracture of a compact fluorescent bulb at room temperature.

Referring to FIG. 11, a graph shows effect of in situ sorbents on mercury vapor release following catastrophic fracture of a CFL at room temperature. Top curve: no sorbent; Bottom curves: same CFL broken in presence of sulfur-impregnated activated carbon (1 g HgR) and unstabilized nano-selenium (10 mg) either as dry nano-powder or impregnated cloth. The integrated mercury released over the course of this experiment is 113 µg (untreated lamp), 20 µg (1 g HgR treatment), 1.6 µg (Se in vials), and 1.2 µg (Se-impregnated cloth). The commercial sulfur-impregnated activated carbon reduced the mercury release by 83% over the untreated bulb, making it a viable candidate for in situ capture of mercury vapor. Moreover, the low cost and low toxicity of this material make it an attractive option for consumer use. Even better performance was exhibited by the unstabilized nano-selenium, which decreased the mercury release by 99% over an untreated bulb, regardless of the application method, and with 100-fold less sorbent mass. Nearly complete suppression of mercury vapor from fractured lamps can be achieved by sealing the lamp in a confined space with 10 mg of unstabilized nanoselenium for 24 hours, either as an impregnated cloth draped over the fractured bulb or as a loose powder in vials.

In summary, based upon the experiments above, the sorbent materials are effective in capturing and stabilizing mercury. In one embodiment, the sorbent materials are nanoparticles selected from a group consisting of: nano-Cu, nano-Ag, nano-Se, nano-S, nano-Ni, nano-Zn, and nano-$WS_2$ are effective in capturing mercury. Most importantly, the sorbent materials which are colloidal, unstabilized, nano-Se are most effective in capturing or absorbing mercury.

However, it should be noted that nano-particles are an example of one type of sorbent that may be used in the packaging material or package. The additional sorbents may be a micro-scale powder, solution, granular, soluble compound, or sorbent. The sorbent may be activated carbon, impregnated activated carbon, or other impregnated or chemically modified activated carbon products. In addition, the soluble compound may be thiosulfate.

Figure 12:
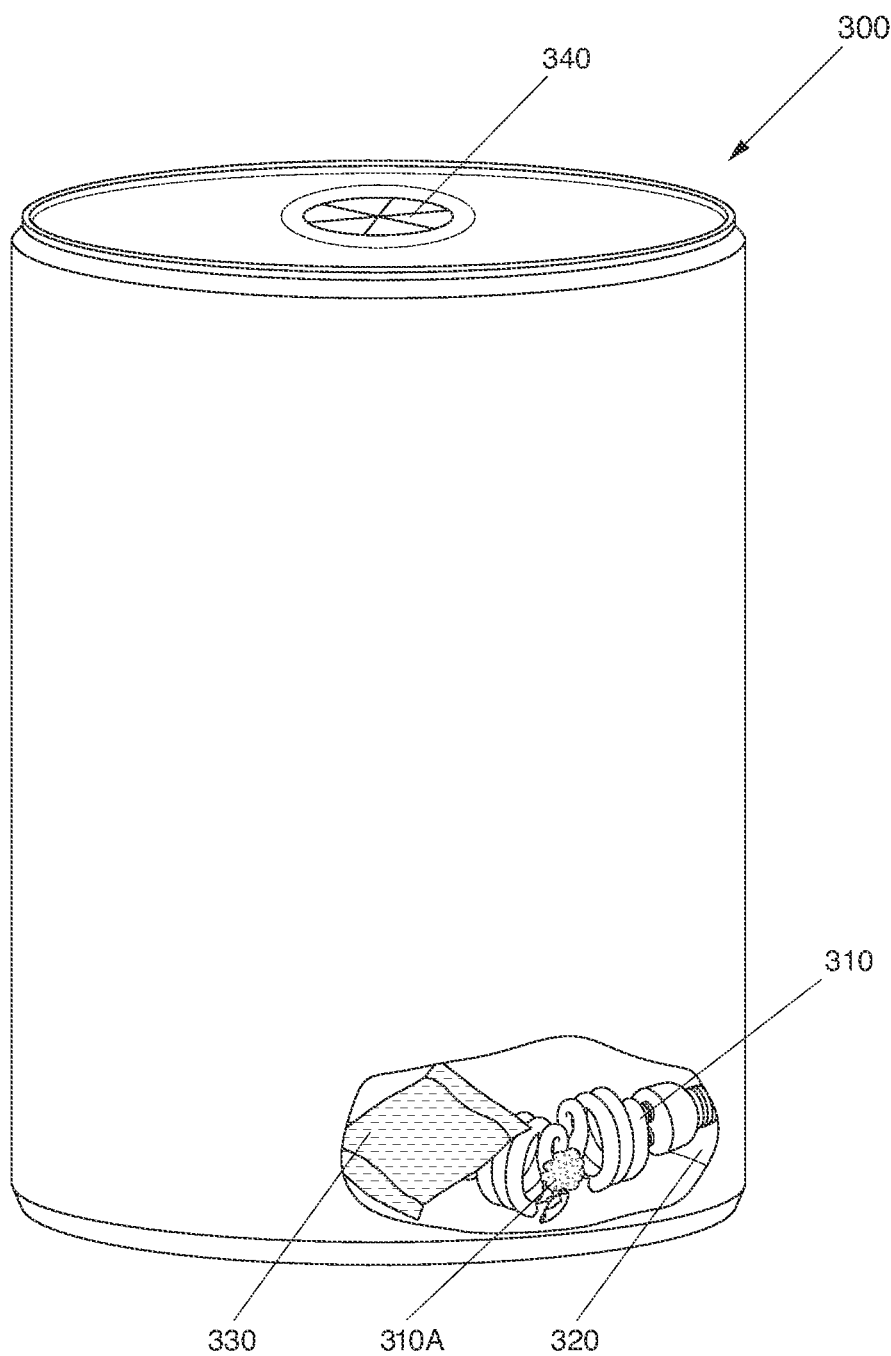
FIG. 12 is a perspective view of a recycling container with a cut-out view of sorbent material contained therein.

Referring to FIG. 12, recycling centers may use sorbent materials to capture and stabilize mercury. When products are placed in the recycling container 300, the products 310 integrity may be compromised which will release mercury 310A inside the recycling container 300. To capture and stabilize the mercury, the lining 320 of the recycling container 300 is impregnated or coated with the sorbent materials. Furthermore, in another embodiment, the sorbent materials are contained in a pouch 330 and placed inside a recycling container to capture and stabilize the mercury. Also, the sorbent materials may be dispersed on the floors, ceilings, walls, or other surfaces contained within the recycling center or environment.

To facilitate the capturing of mercury, the recycling containers 300 or receptacles should have closing mechanisms 340 to suppress the mercury. The reason for this closing mechanism 340 is that the sorbent materials react with mercury slowly, so if the receptacle is open, some of the mercury will escape while the reaction is proceeding. The combination of enclosing the recycling container 300 and including the sorbent materials 320, 330 leads to the suppression and absorption of mercury.

Figure 13:
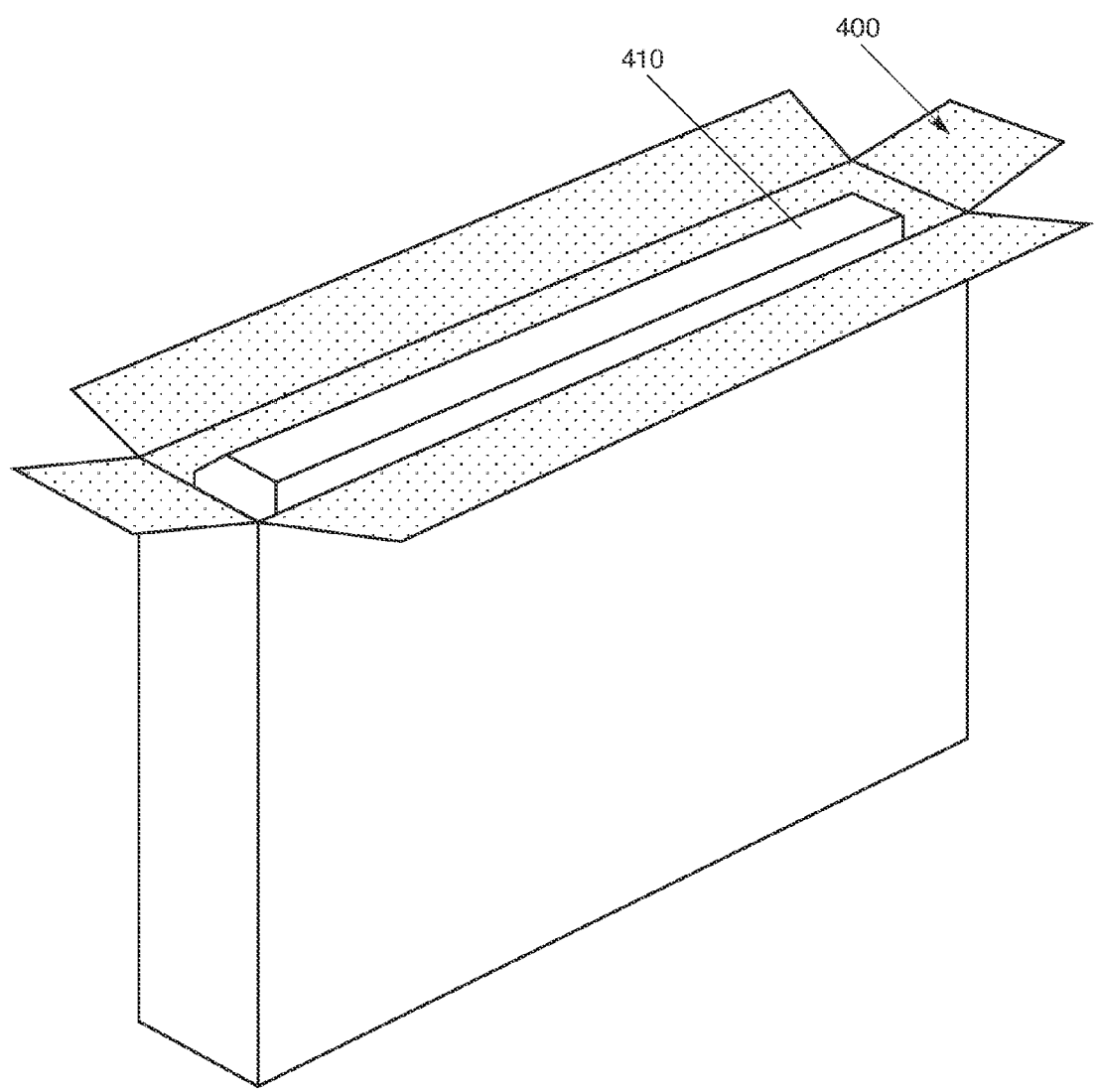
FIG. 13 is a perspective view of a packaging containing sorbent material for a flat screen television.

Referring to FIG. 13, flat-screen televisions 410 and other electronic components also are known to contain mercury. It is contemplated that the sorbent materials may be used in reusable packaging 400 for flat-screen televisions or other electronic components, separate sheets or linings in the packaging for flat-screen televisions or other electronic components, or bags lined with sorbent materials contained within the flat-screen television or other electronic components. In addition, flat screen televisions or other electronic components may also contain sorbent materials to capture and stabilize mercury.

A method for producing a recycling container containing sorbent materials contains the following steps. First, the sorbent materials are provided to capture and stabilize mercury. Second, a recycling container is provided with an inner lining. Third, the sorbent materials are coated or impregnated onto an inner lining of the recycling container. It should be noted that the lining of the recycling container may be removed and replaced when containing mercury.

Figure 14:
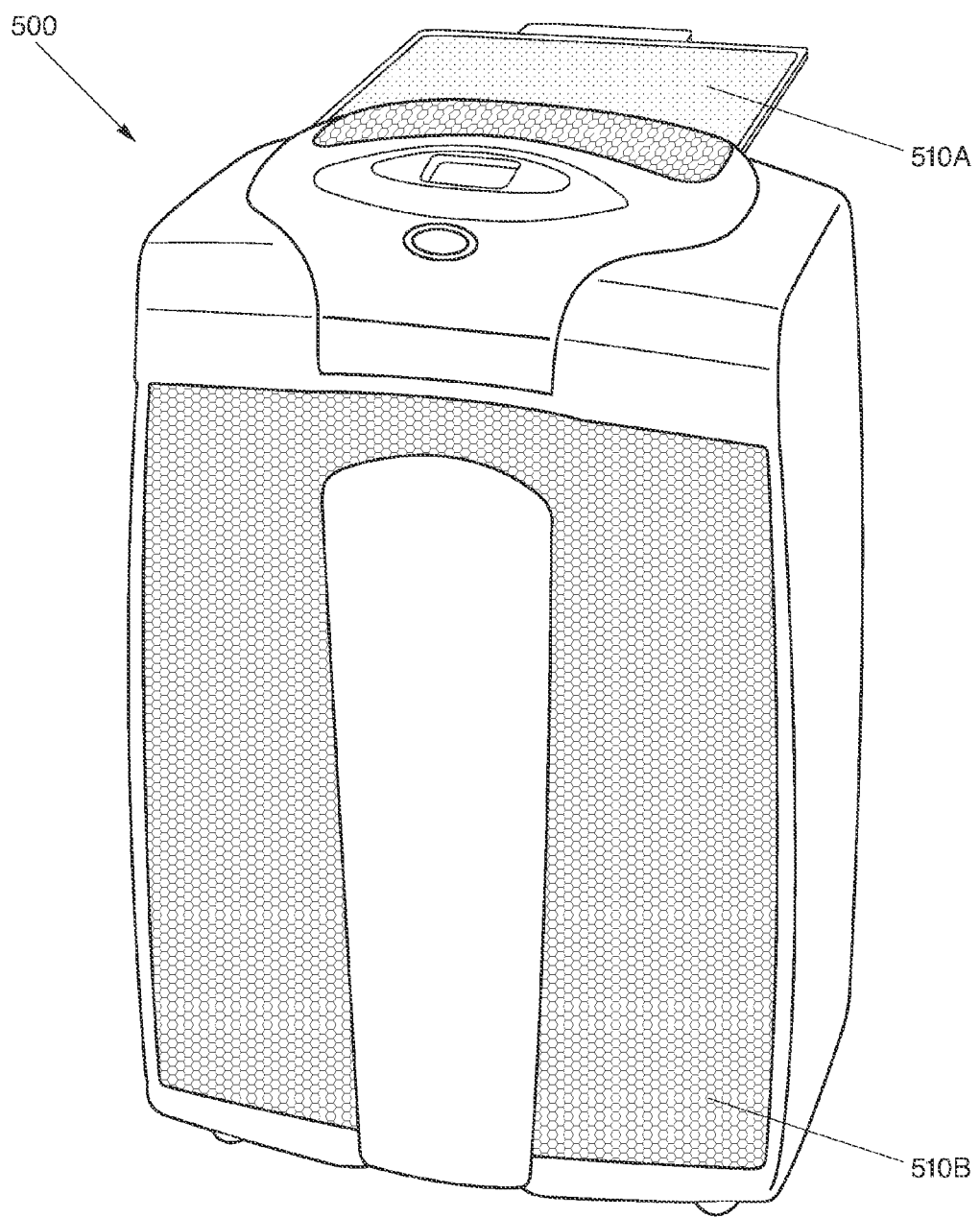
FIG. 14 is a perspective view of an air purifier having a filter containing sorbent material.

Referring to FIG. 14, sorbent materials may be provided within air filters or air purifying machines 500 containing air filters 510A, 510B. The air filter machine 500 may contain filters 510A, 510B, either integrally formed or removable which contain sorbent materials to capture and stabilize mercury. The air filters and machines may be used in a residential or commercial building, such as a laboratory.

Figure 15:
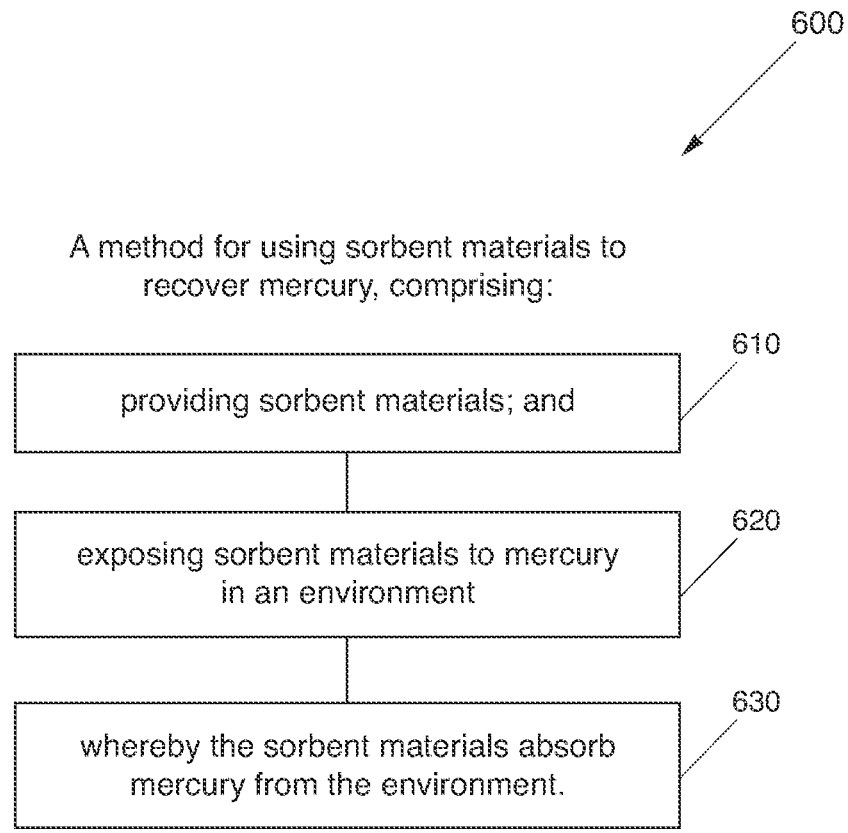
FIG. 15 is a block diagram of a method for capturing mercury using sorbent material.

Referring to FIG. 15, a block diagram for the method 600 for using sorbent materials to capture and stabilize mercury is illustrated. The method 600 contains the following steps. First, the sorbent materials are provided 610. The sorbent materials, in one embodiment, are nano-particles which are selected from a group consisting of: nano-Cu, nano-Ag, nano-Se, nano-S, nano-Ni, nano-Zn, and nano-$WS_2$ or any nano-particle used for the capturing of mercury. In a preferred embodiment, the nano-particles are unstabilized, amorphous, and colloidal. As shown in FIG. 11, the concentration of mercury released after capturing by a nano-particle is highly effective when using unstabilized, colloidal, nano-selenium.

It should be noted that nano-particles are an example of one type of sorbent that may be used in the packaging material or package. The additional sorbents may be a micro-scale powder, solution, granular, soluble compound, or sorbent. The sorbent may be activated carbon, impregnated activated carbon, or halogen-impregnated activated carbon. In addition, the soluble compound may be thiosulfate.

In another embodiment, the sorbent materials are impregnated, coated, sprayed, dispersed, dipped, or injected onto a carrier material. The carrier material may be either a non-porous or porous carrier material. In one embodiment, the carrier material may be a combination of a non-porous and porous material. The carrier material may be selected from a group consisting of: cardboard, textiles, Styrofoam, paper, and plastics.

Next, the sorbent materials are exposed to mercury in an environment 620. The environment can be either indoors or outdoors. For example, the indoor environment may be a building, office, dentist's office, laboratory, recycling center, store, residential or commercial building, warehouse, shipping vessel, shipping container, recycling center, container, packaging, storage space, and vehicle or any other environment where mercury is found. More specifically, the mercury may be spilled on carpeting or porous substrates in the indoor environment and may require remediation.

For the outdoor environment, it may be a landfill, stadium, office park, or any other outdoor environment where mercury is found. When the sorbent materials are exposed to mercury, the nano-particles absorb or react with mercury from the environment 630.

Figure 16:
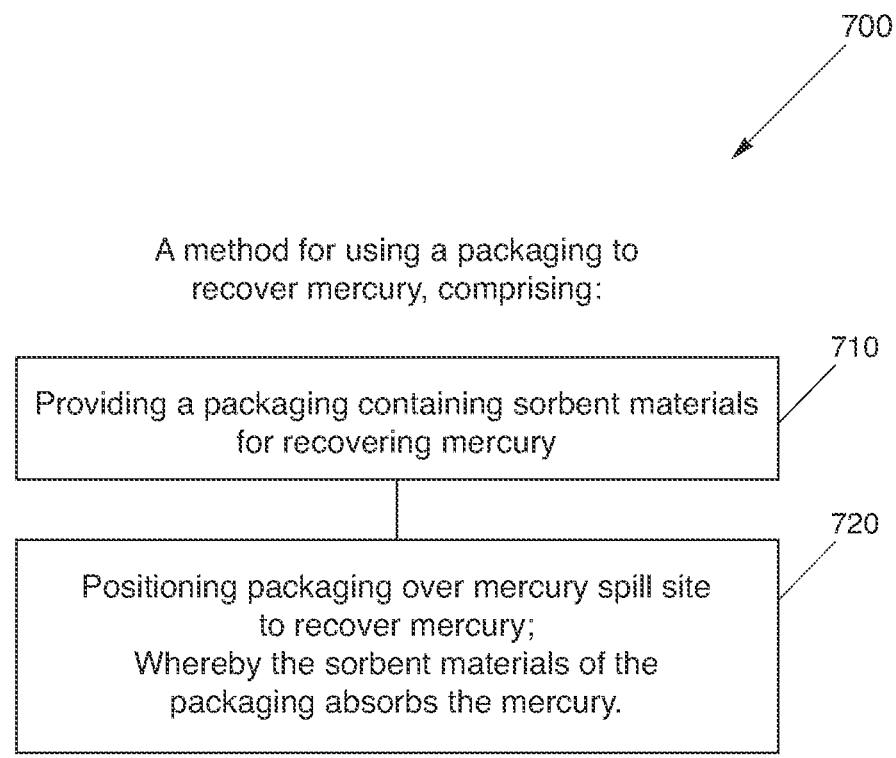
FIG. 16 is a block diagram of a method for using a packaging containing sorbent material to capturing mercury.
Figure 17:
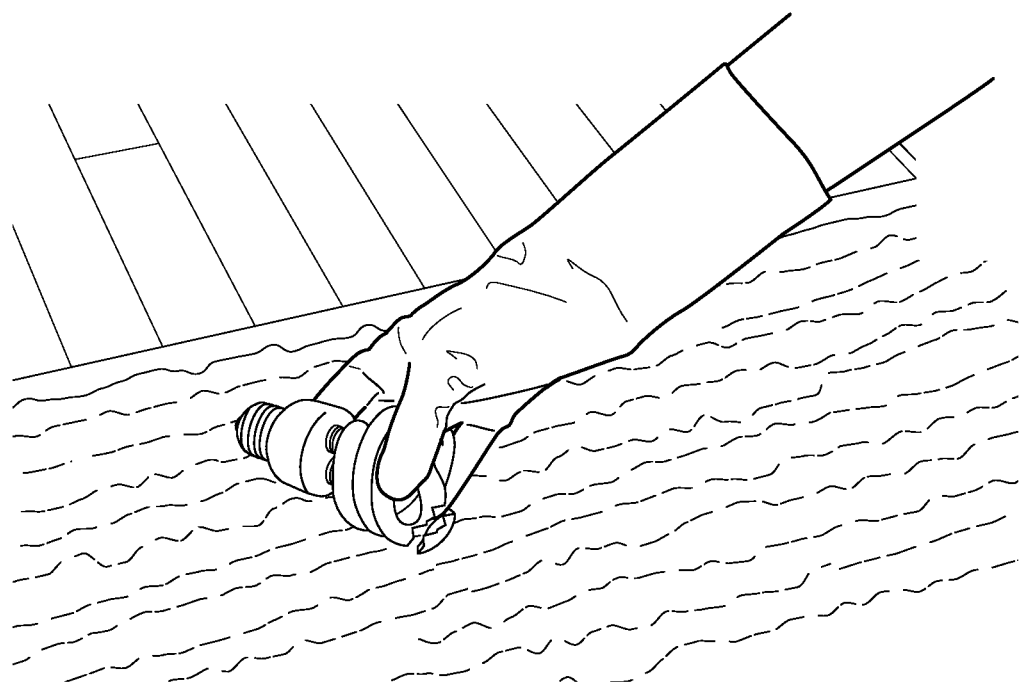
FIG. 17 is a perspective view of a broken bulb and a user removing the broken bulb.
Figure 18:
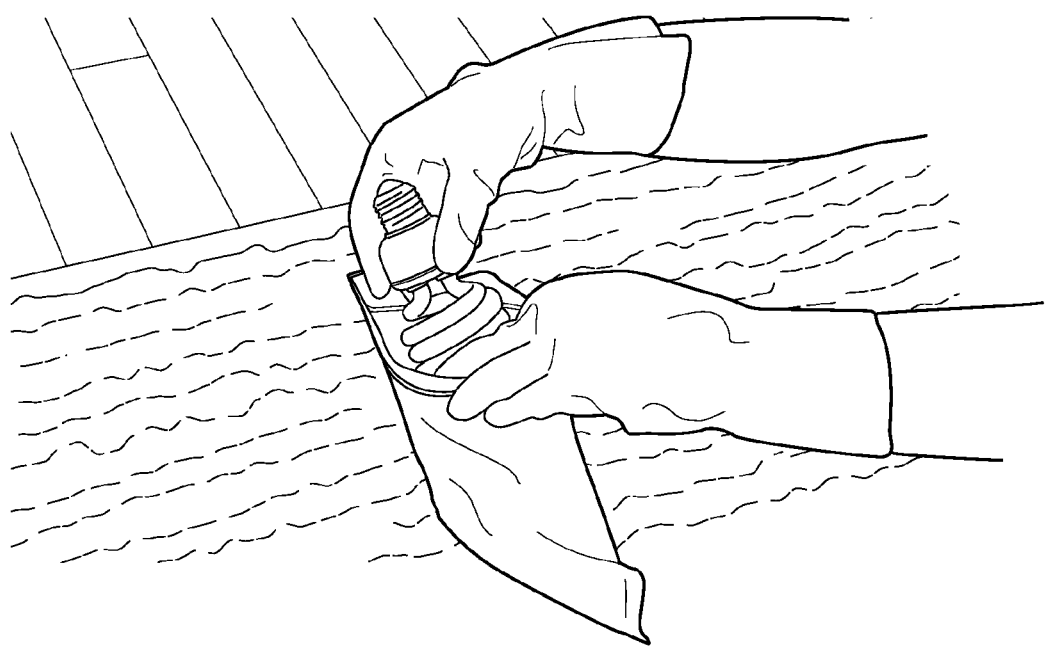
FIG. 18 is a perspective view of a user placing the broken bulb of FIG. 17 into a container lined with sorbent material.
Figure 19:
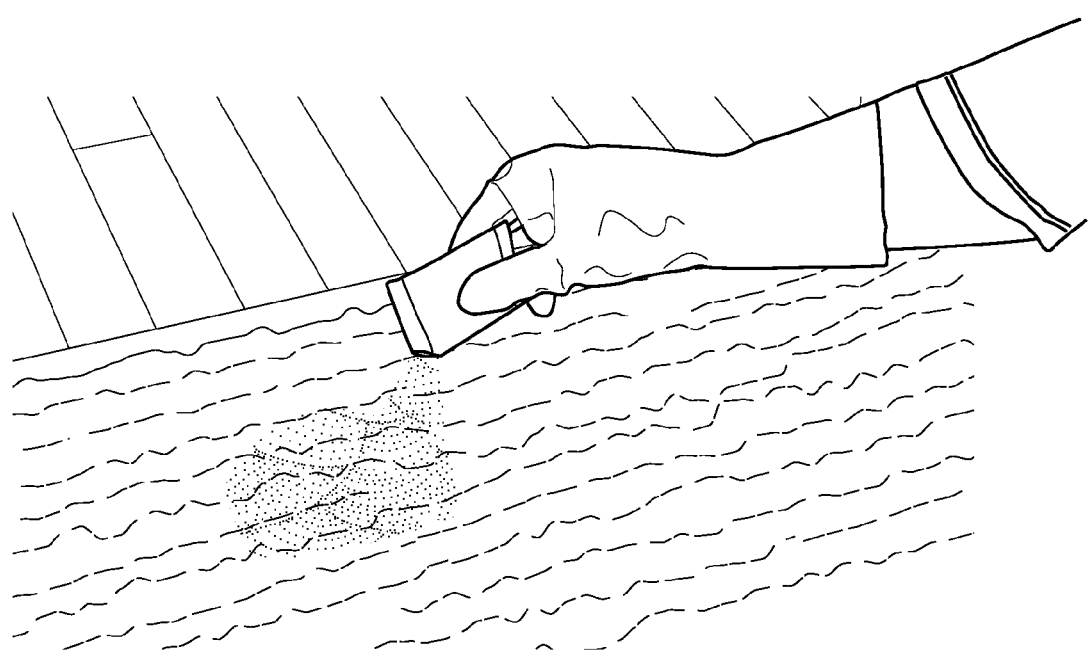
FIG. 19 is a perspective view of a user dispersing a powdered form of the sorbent material over mercury spillage site.

Referring to FIG. 16, a block diagram for the method 700 for using packaging material or packaging to capture and stabilize mercury is illustrated. The method 700 contains the following steps. The first step is to remove debris, such as broken bulbs, is removed from the mercury spillage site. (FIG. 17) and place the debris into a proper container lined with sorbent materials (FIG. 18). Second, powdered sorbent materials are provided for capturing of mercury. (FIG. 18) Third, the sorbent materials are dispersed over a mercury spillage site. (FIG. 19)

Figure 20:
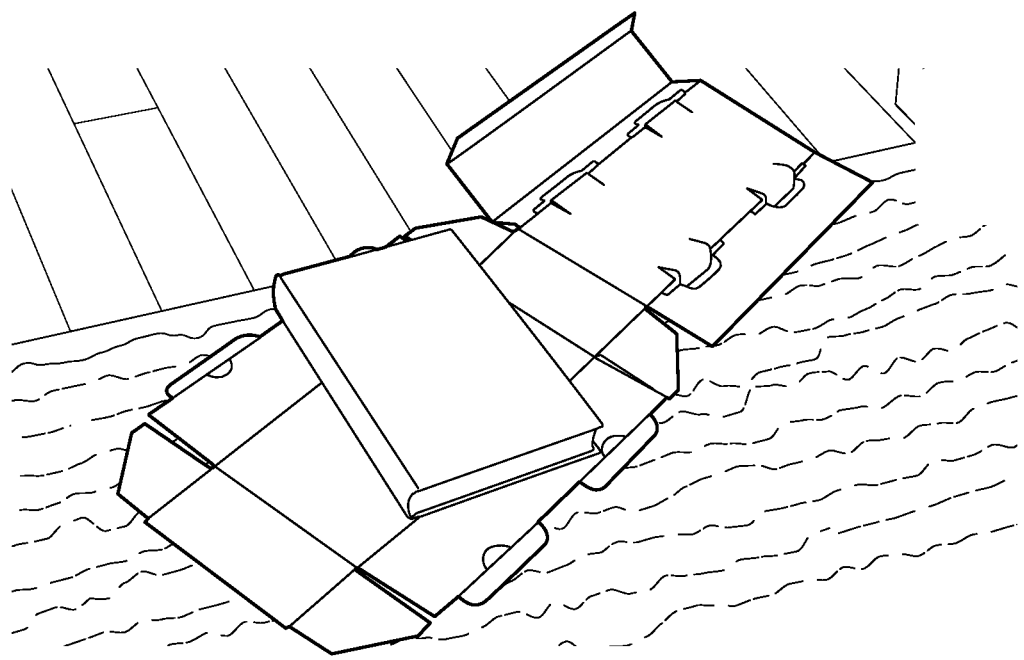
FIG. 20 is a perspective view of the packaging positioned over the mercury spillage site with an object resting thereupon to facilitate suppression of the mercury.

Next, a packaging material is provided that contains sorbent materials for capturing of mercury 710. In one embodiment, the packaging material forms a shape of a box which can be used to hold bulbs. Referring to FIG. 20, the packaging material is positioned over mercury spill site to capture and stabilize mercury 720. To facilitate suppression of the mercury, an object may be placed on the packaging material. As a result, the sorbent materials absorb or react with the mercury. After capturing of the mercury, the packaging material is disposed. It should be noted that the package for this method may be any type of packaging containing sorbent materials for capturing of mercury.

Figure 21:
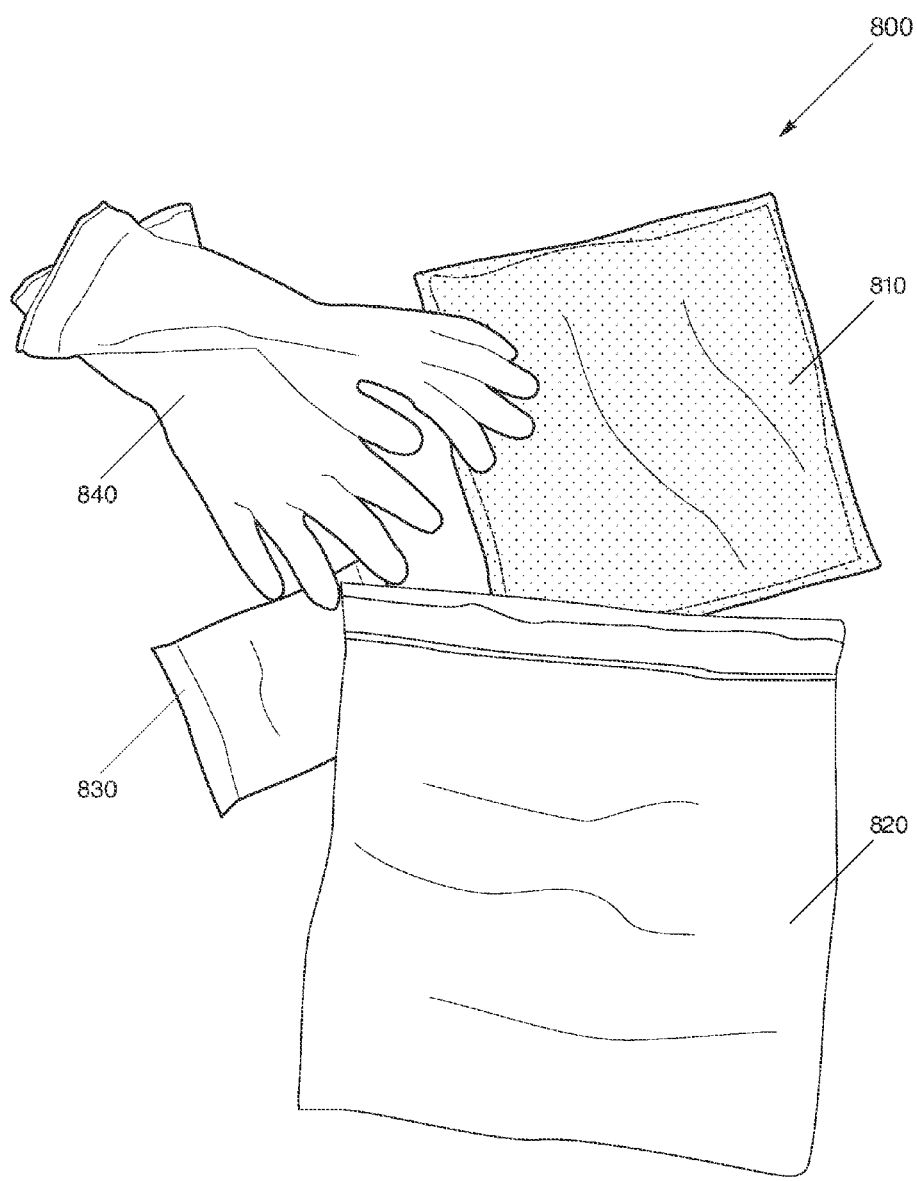
FIG. 21 is a kit containing at least one item having sorbent materials for capturing mercury.

In another embodiment, a kit containing items having sorbent materials may be provided to capturing mercury. For example, in FIG. 21, a bag 820 or box is used with a cloth 810 impregnated with sorbent materials, a pair of gloves 840, and a packet of powdered nano-selenium 830. The items are selected from a group consisting of: cloth (FIG. 22), bags, packaging, gloves, paper towels, cardboard, squeegee, eyedropper, duct tape, shaving cream, paint brush, flashlight, or sorbent materials in powder form, and combinations.

Figure 22:
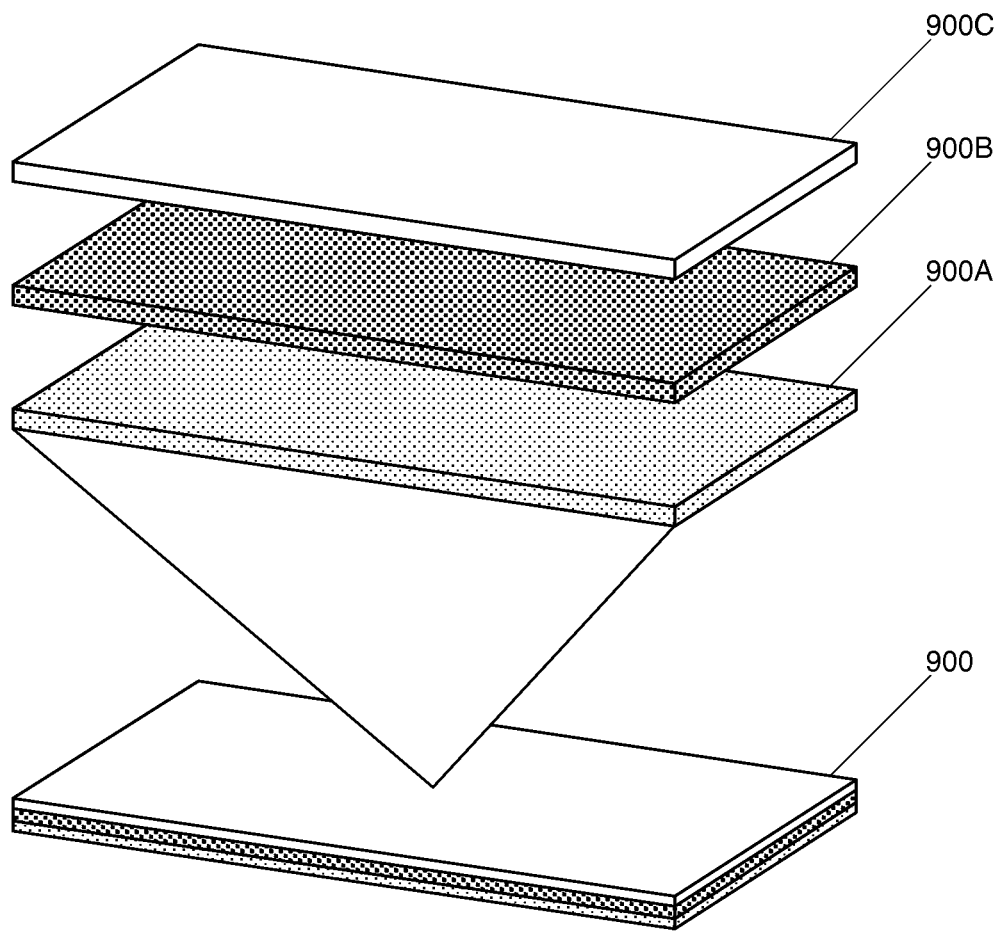
FIG. 22 is an exploded view of a nanosorbent cloth.

Referring to FIG. 22, a nanosorbent cloth 900 is illustrated which is used for safely cleaning a CFL breakage site. The nanosorbent cloth 900 contains, in one embodiment, three layers: a protective layer 900A, an active layer 900B, and a barrier layer 900C. The protective layer 900A is porous and undoped to avoid user contact or abrasion of the active layer 900B. The active layer 900B is porous and doped with sorbent materials discussed above for reacting with mercury vapor. The barrier layer 900C is non-porous to trap mercury vapor to facilitate reaction of mercury vapor with sorbent materials. These three layers may be combined or separate and distinct within the nano-sorbent cloth 900. In use, the nanosorbent cloth 900 may be placed over a site containing a broken CFL, such as a carpet, which is releasing mercury vapor, to capture and stabilize the mercury vapor.

The present invention provides a unique method and packaging material using sorbent materials to capture and stabilize mercury. In particular, sorbent materials containing colloidal, unstabilized, nano-Se are effective in capturing mercury from any environment. Based upon the experiments disclosed, the use of sorbent materials, such as nano-Se, to capturing mercury is highly effective. In addition, it should be noted the sorbent materials may be used in a variety of packaging materials and environments beyond those disclosed herein.

Therefore, while there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A composition of matter, comprising:
   unstabilized nano-Se composite having high mercury capture comprising:
   nano-Se particles situated on a support.

2. The composition of matter of claim 1, wherein the nano-SE is crystalline.

3. The composition of matter of claim 1, wherein the nano-SE is a plurality of closely-packed and connected nano-SE particles.

4. The composition of matter of claim 1, wherein the nano-SE is mixed with inert matter.

5. The composition of matter of claim 1, wherein the nano-SE is mixed with active matter.

6. The composition of matter of claim 1, wherein the nano-SE is mixed with inert matter and active matter.

7. The composition of matter of claim 1, wherein the nano-SE is mixed with a material selected from a group consisting of: silica, carbon black, and activated carbon.

8. A composition of matter, comprising:
   unstabilized nano-Se composite having high mercury capture comprising:

nano-Se particles and a reducing agent situated on a support.

9. The composition of matter of claim 8, wherein the reducing agent is ascorbic acid.

10. The composition of matter of claim 8, herein the nano-SE is amorphous.

11. The composition of matter of claim 8, wherein the nano-SE is crystalline.

12. A composite having high mercury capture, comprising: unstabilized nano-Se particles situated on a support.

13. The composite of claim 12, further comprising: a reducing agent situated on the support.

* * * * *